United States Patent
Akah et al.

(10) Patent No.: US 11,760,943 B1
(45) Date of Patent: Sep. 19, 2023

(54) NANO-ZSM-11 FOR DIRECT CONVERSION OF CRUDE OIL TO LIGHT OLEFINS AND AROMATICS

(71) Applicants: Saudi Arabian Oil Company, Dhahran (SA); King Fahd University of Petroleum and Minerals, Dhahran (SA)

(72) Inventors: Aaron Chi Akah, Dhahran (SA); Ziyauddin S. Qureshi, Dhahran (SA); Abdullah M. Aitani, Dhahran (SA); Siddiqui M. Abdulbari, Dhahran (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 18/053,545

(22) Filed: Nov. 8, 2022

(51) Int. Cl.
  *C10G 45/12* (2006.01)
  *B01J 29/40* (2006.01)
  *B82Y 30/00* (2011.01)

(52) U.S. Cl.
  CPC .............. *C10G 45/12* (2013.01); *B01J 29/40* (2013.01); *B82Y 30/00* (2013.01)

(58) Field of Classification Search
  CPC ............ C10G 45/12; B01J 29/40; B82Y 30/00
  USPC ........................................................ 208/91
  See application file for complete search history.

(56) References Cited

U.S. PATENT DOCUMENTS

| 7,863,212 | B2 | 1/2011 | Wakui | |
| 2020/0009523 | A1* | 1/2020 | Chen | B01J 8/26 |
| 2021/0130712 | A1* | 5/2021 | Abudawoud | C10G 63/04 |
| 2021/0246389 | A1* | 8/2021 | Koseoglu | C10G 69/14 |
| 2021/0331988 | A1* | 10/2021 | Fickel | C07C 7/005 |

OTHER PUBLICATIONS

Akah et al., "An Overview of Light Olefins Production via Steam Enhanced Catalytic Cracking", Catalysis Surveys from Asia, vol. 23, pp. 265-276, 2019.
Barghi et al., "Modeling of ZnZSM-5 deactivation during liquefied petroleum gas catalytic cracking in the presence of steam", Reaction Kinetics, Mechanism and Catalysis, vol. 120, pp. 753-773, 2017.
Corma et al., "Steam catalytic cracking of naphtha over ZSM-5 zeolite for production of propene and ethene: Micro and macroscopic implications of the presence of steam", Applied Catalysis A:General, vol. 417-418, pp. 220-235, 2012.

(Continued)

*Primary Examiner* — Prem C Singh
*Assistant Examiner* — Francis C Campanell
(74) *Attorney, Agent, or Firm* — DINSMORE & SHOHL LLP

(57) ABSTRACT

A process for upgrading a hydrocarbon feed includes contacting the hydrocarbon feed with steam in the presence of a cracking catalyst in a steam catalytic cracking reactor at reaction conditions sufficient to cause at least a portion of hydrocarbons in the hydrocarbon feed to undergo one or more cracking reactions to produce a steam catalytic cracking effluent comprising light olefins, light aromatic compounds, or both, where the cracking catalyst comprises a ZSM-11 zeolite.

19 Claims, 7 Drawing Sheets

(56) References Cited

OTHER PUBLICATIONS

Corma et al., "IM-5 zeolite for steam catalytic cracking of naphtha to produce propene and ethene. An alternative to ZSM-5 zeolite", Applied Catalysis A: General, vol. 460-461, pp. 106-115, 2013.
Fumoto et al., "Iron Oxide-Based Catalyst for Catalytic Cracking of Heavy Oil", IntechOpen, London, pp. 93-110, 2018.
Ghashghaee et al., "Steam catalytic cracking of fuel oil over a novel composite nanocatalyst: Characterization, kinetics and comparative perspective", Journal of Analytical and Applied Pyrolysis, vol. 138, pp. 281-293, 2019.
Gugel, "Executive Viewpoint: Introducing the refinery of the future", Hydrocarbon Processing, pp. 1-3, Mar. 2019.
Lee, "Petrochemicals—The Growth Area that Refiners Will Need", Tecnon OrbiChem Marketing Seminar at APIC, 16 pages. May 16, 2019.
Meng et al., "Studies on catalytic pyrolysis of heavy oils: Reaction behaviors and mechanistic pathways", Applied Catalysis A: General, vol. 294, pp. 168-176, 2005.
Mukherjee, KBR Olefins Technology—Technology options to meet uncertain market conditions, Presented at the 4th Petrochemicals Conclave, Delhi, Feb. 2015, 36 pages.

\* cited by examiner

NANO-ZSM-11 FOR DIRECT CONVERSION OF CRUDE OIL TO LIGHT OLEFINS AND AROMATICS

BACKGROUND

Field

The present disclosure relates to processes and catalysts for processing hydrocarbon materials and, in particular, processes and catalyst compositions for steam enhanced catalytically cracking of crude oil to produce olefins, aromatic compounds, or both.

Technical Background

The worldwide increasing demand for greater value petrochemical products and chemical intermediates remains a major challenge for many integrated refineries. In particular, the production of some valuable light olefins, such as ethylene and propylene, has attracted increased attention as pure olefin streams are considered the building blocks for polymer synthesis. Additionally, light aromatic compounds, such as benzene, toluene, and mixed xylenes can be useful as fuel blending constituents or can be converted to greater value chemical products and intermediates, which can be used as building blocks in chemical synthesis processes. Petrochemical feeds, such as crude oils, can be converted to petrochemicals, such as fuel blending components and chemical products and intermediates, such as light olefins and aromatic compounds, which are basic intermediates for a large portion of the petrochemical industry. Crude oil is conventionally processed by distillation followed by various reforming, solvent treatments, and hydroconversion processes to produce a desired slate of fuels, lubricating oil products, chemicals, chemical feedstocks, and the like. Conventional refinery systems generally combine multiple complex refinery units with petrochemical plants to produce greater value petrochemical products and intermediates.

SUMMARY

Accordingly, there is an ongoing need for cracking catalysts and processes for steam enhanced catalytic cracking of crude oil feeds and other hydrocarbon feeds to produce greater yields of light olefins, light aromatic compounds, or both. The present disclosure is directed to processes for upgrading a hydrocarbon feed. The processes include contacting the hydrocarbon feed with steam in the presence of a cracking catalyst in a steam catalytic cracking reactor at reaction conditions sufficient to cause at least a portion of hydrocarbons in the hydrocarbon feed to undergo one or more cracking reactions to produce a steam catalytic cracking effluent. The cracking catalyst comprises a ZSM-11 zeolite. The steam catalytic cracking effluent may include light olefins, light aromatic compounds, or both.

According one or more aspects of the present disclosure, a process for upgrading a hydrocarbon feed comprises contacting the hydrocarbon feed with steam in the presence of a cracking catalyst in a steam catalytic cracking reactor at reaction conditions sufficient to cause at least a portion of hydrocarbons in the hydrocarbon feed to undergo one or more cracking reactions to produce a steam catalytic cracking effluent comprising light olefins, light aromatic compounds, or both, where the cracking catalyst comprises a ZSM-11 zeolite.

Additional features and advantages of the aspects of the present disclosure will be set forth in the detailed description that follows and, in part, will be readily apparent to a person of ordinary skill in the art from the detailed description or recognized by practicing the aspects of the present disclosure.

BRIEF DESCRIPTION OF THE DRAWINGS

The following detailed description of the present disclosure may be better understood when read in conjunction with the following drawings in which.

Figure 1:
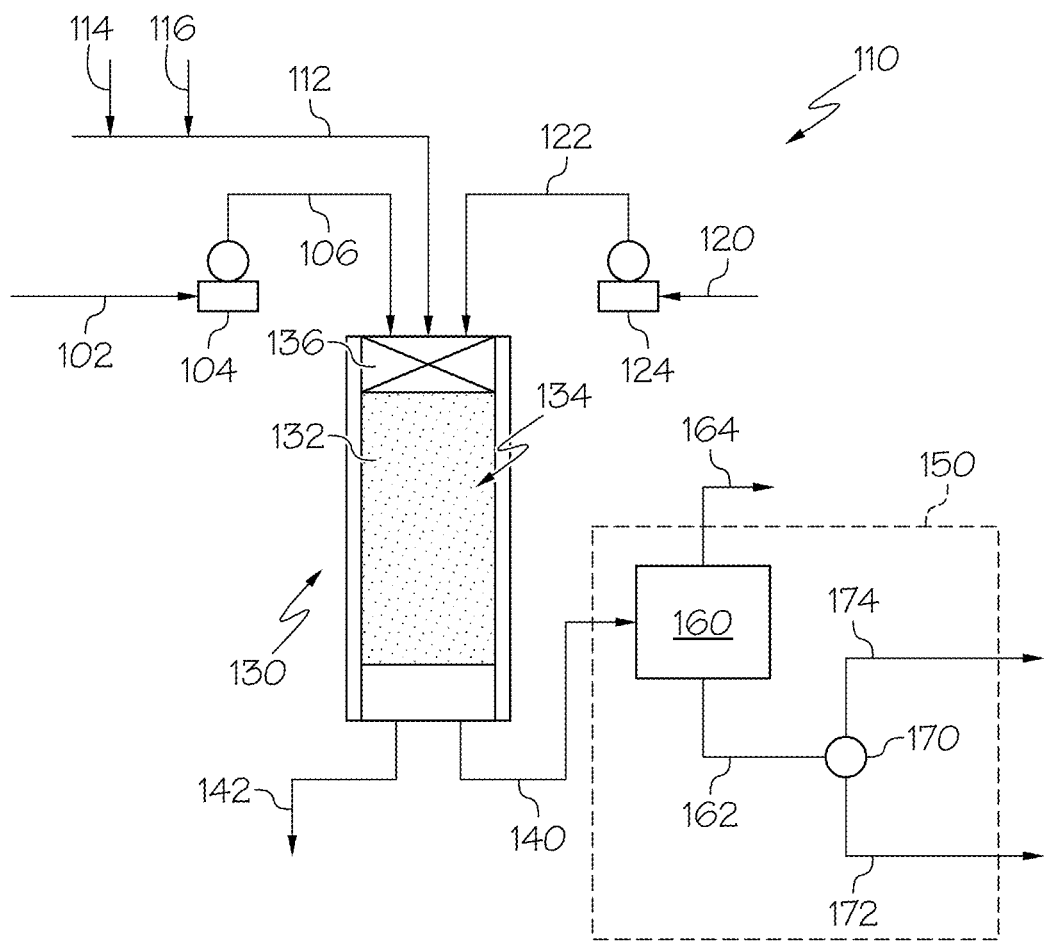
FIG. 1 schematically depicts a generalized flow diagram of a fixed bed reactor system for steam catalytic cracking of crude oil to produce light olefins and light aromatic compounds, according to one or more embodiments shown and described in the present disclosure.
Figure 10:
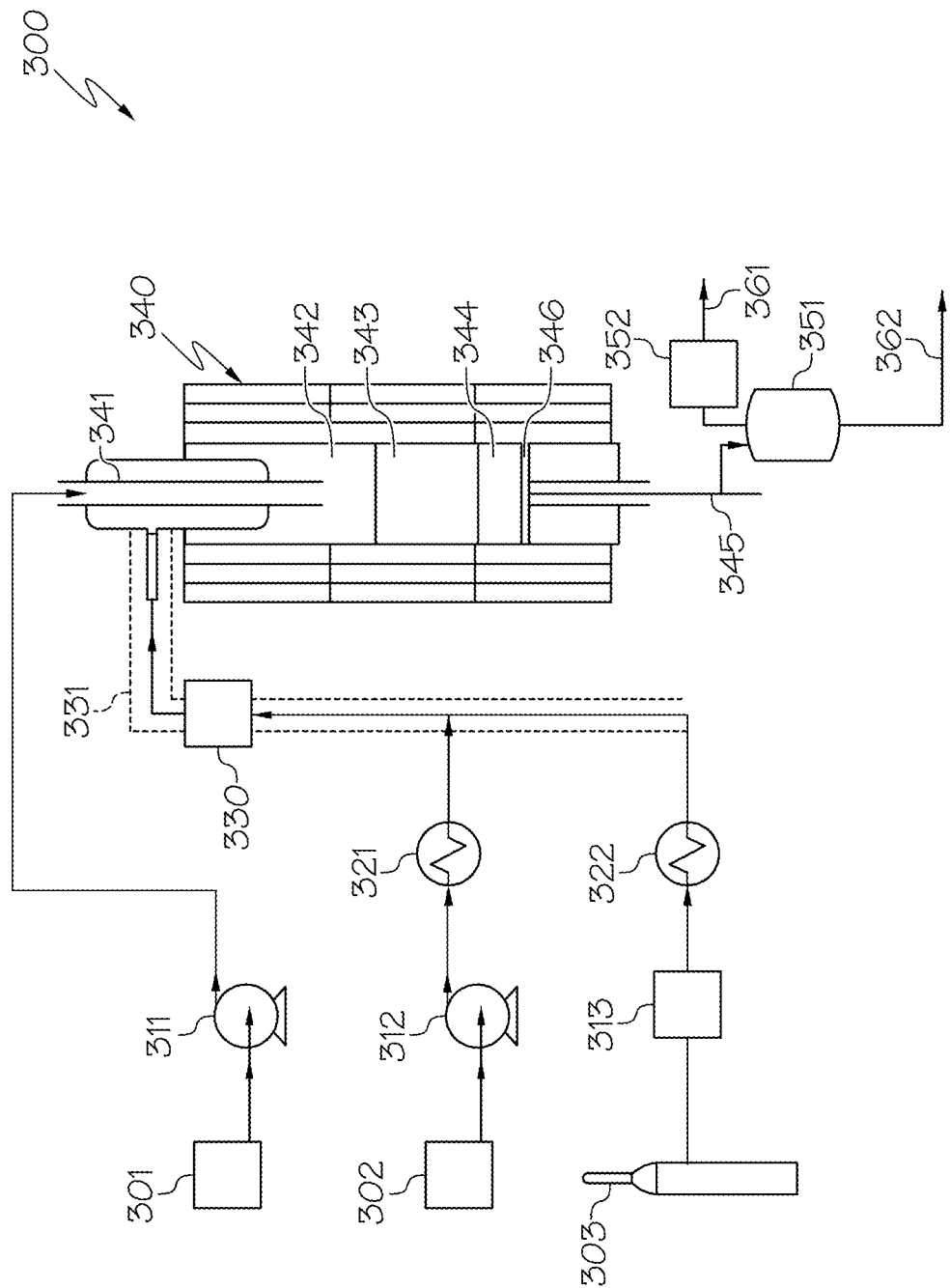
FIG. 10 schematically depicts a generalized flow diagram of a fixed bed reactor system for evaluating the cracking catalysts, according to one or more embodiments shown and described in the present disclosure.

When describing the simplified schematic illustrations of FIGS. 1 and 10 the numerous valves, temperature sensors, electronic controllers, and the like, which may be used and are well known to a person of ordinary skill in the art, may not be included. Further, accompanying components that are often included in systems such as those depicted in FIGS. 1 and 10, such as air supplies, heat exchangers, surge tanks, and the like also may not be included. However, a person of ordinary skill in the art understands that these components are within the scope of the present disclosure.

Additionally, the arrows in the simplified schematic illustrations of FIGS. 1 and 10 refer to process streams. However, the arrows may equivalently refer to transfer lines, which may transfer process streams between two or more system components. Arrows that connect to one or more system components signify inlets or outlets in the given system components and arrows that connect to only one system component signify a system outlet stream that exits the depicted system or a system inlet stream that enters the depicted system. The arrow direction generally corresponds with the major direction of movement of the process stream or the process stream contained within the physical transfer line signified by the arrow.

The arrows in the simplified schematic illustrations of FIGS. 1 and 10 may also refer to process steps of transporting a process stream from one system component to another system component. For example, an arrow from a first system component pointing to a second system component may signify "passing" a process stream from the first system component to the second system component, which may comprise the process stream "exiting" or being "removed" from the first system component and "introducing" the process stream to the second system component.

Reference will now be made in greater detail to various aspects, some of which are illustrated in the accompanying drawings.

DETAILED DESCRIPTION

The present disclosure is directed to cracking catalysts and processes for steam enhanced catalytic cracking of crude oil to produce greater yields of light olefins, light aromatic compounds, or both. A process of the present disclosure for upgrading a hydrocarbon feed may include contacting the hydrocarbon feed with steam in the presence of a cracking catalyst in a steam catalytic cracking reactor at reaction conditions sufficient to cause at least a portion of hydrocarbons in the hydrocarbon feed to undergo one or more cracking reactions to produce a steam catalytic cracking effluent comprising light olefins, light aromatic compounds, or both. The cracking catalyst may comprise, consist of, or consist essentially of a ZSM-11 zeolite.

The ZSM-11 zeolite may be prepared by a method including adding tetraethyl orthosilicate to a solution comprising $Al(NO_3)_3 \cdot 9H_2O$ and water to produce a first mixture, adding metal hydroxide to the first mixture to produce a second mixture, adding ammonium hydroxide to the second mixture to produce a third mixture, aging the third mixture at a temperature of from 100° C. to 300° C. for a time period sufficient to crystalize the third mixture to produce solid particles, and calcining the solid particles at a temperature of from 400° C. to 800° C. for 1 to 12 hours to produce the ZSM-11 zeolite.

As used in the present disclosure, the term "cracking" refers to a chemical reaction where a molecule having carbon-carbon bonds is broken into more than one molecule by the breaking of one or more of the carbon-carbon bonds. As used in the present disclosure, the term "catalytic cracking" refers to cracking conducted in the presence of a catalyst. Some catalysts may have multiple forms of catalytic activity, and calling a catalyst by one particular function does not render that catalyst incapable of being catalytically active for other functionality.

As used in the present disclosure, the term "catalyst" refers to any substance that increases the rate of a specific chemical reaction, such as but not limited to cracking reactions.

As used in the present disclosure, the term "used catalyst" refers to catalyst that has been contacted with reactants at reaction conditions, but has not been regenerated in a regenerator or through a regeneration process. The "used catalyst" may have coke deposited on the catalyst and may include partially coked catalyst as well as fully coked catalysts. The amount of coke deposited on the "used catalyst" may be greater than the amount of coke remaining on the regenerated catalyst following regeneration. The "used catalyst" may also include catalyst that has a reduced temperature due to contact with the reactants compared to the catalyst prior to contact with the reactants.

As used in the present disclosure, the term "regenerated catalyst" refers to catalyst that has been contacted with reactants at reaction conditions and then regenerated in a regenerator or regenerated through an in place regeneration process to heat the catalyst to a greater temperature, oxidize and remove at least a portion of the coke or other organic contaminants from the catalyst to restore at least a portion of the catalytic activity of the catalyst, or both. The "regenerated catalyst" may have less coke or organic contaminants, a greater temperature, or both, compared to a used catalyst and may have greater catalytic activity compared to used catalyst. The "regenerated catalyst" may have more coke and lesser catalytic activity compared to fresh catalyst that has not been contacted with reactants a cracking reaction zone and then regenerated.

As used throughout the present disclosure, the terms "butenes" or "mixed butenes" are used interchangeably and refer to combinations of one or a plurality of isobutene, 1-butene, trans-2-butene, or cis-2-butene. As used throughout the present disclosure, the term "normal butenes" refers to a combination of one or a plurality of 1-butene, trans-2-butene, or cis-2-butene. As used throughout the present disclosure, the term "2-butenes" refers to trans-2-butene, cis-2-butene, or a combinations of these.

As used in this disclosure, the term "initial boiling point" or "IBP" of a composition refers to the temperature at which the constituents of the composition with the least boiling point temperatures begin to transition from the liquid phase to the vapor phase. As used in this disclosure, the term "end boiling point" or "EBP" of a composition refers to the temperature at which the greatest boiling temperature constituents of the composition transition from the liquid phase to the vapor phase. A hydrocarbon mixture may be characterized by a distillation profile expressed as boiling point temperatures at which a specific weight percentage of the composition has transitioned from the liquid phase to the vapor phase.

As used in this disclosure, the term "atmospheric boiling point temperature" refers to the boiling point temperature of a compound at atmospheric pressure.

As used in this disclosure, the term "crude oil" or "whole crude oil" is to be understood to mean a mixture of petroleum liquids, gases, or combinations of liquids and gases, including, in some embodiments, impurities such as but not limited to sulfur-containing compounds, nitrogen-containing compounds, and metal compounds, that have not undergone significant separation or reaction processes. Crude oils are distinguished from fractions of crude oil, which are obtained through fractionation of the crude oil through distillation. In certain embodiments, the crude oil feedstock may be a minimally treated light crude oil to provide a crude oil feedstock having total metals (Ni+V) content of less than 5 parts per million by weight (ppmw) and Conradson carbon residue of less than 5 wt. %.

As used in the present disclosure, the term "directly" refers to the passing of materials, such as an effluent, from a first component of a processing system to a second component of the processing system without passing the materials through any intervening components or unit operations operable to change the composition of the materials. Similarly, the term "directly" also refers to the introducing of materials, such as a feed, to a component of the process system without passing the materials through any preliminary components operable to change the composition of the materials. Intervening or preliminary components or systems operable to change the composition of the materials include reactors and separators, but are not generally intended to include heat exchangers, valves, pumps, sensors, or other ancillary components required for operation of a chemical process.

As used in the present disclosure, the terms "downstream" and "upstream" refer to the positioning of components or unit operations of the processing system relative to a direction of flow of materials through the processing system. For example, a second component is considered "downstream" of a first component if materials flowing through the processing system encounter the first component before encountering the second component. Likewise, the first component is considered "upstream" of the second component if the materials flowing through the processing system encounter the first component before encountering the second component.

As used in the present disclosure, the term "effluent" refers to a stream that is passed out of a reactor, a reaction zone, or a separator following a particular reaction or separation. Generally, an effluent has a different composition than the stream that entered the reactor, reaction zone, or separator. It should be understood that when an effluent is passed to another component or system, only a portion of that effluent may be passed, unless otherwise stated. For example, a slipstream may carry some of the effluent away, meaning that only a portion of the effluent may enter the downstream component or system. The terms "reaction effluent" and "reactor effluent" particularly refer to a stream that is passed out of a reactor or reaction zone.

The term "residence time" refers to the amount of time that reactants are in contact with a catalyst, at reaction conditions, such as at the reaction temperature.

As used in the present disclosure, the term "reactor" refers to any vessel, container, conduit, or the like, in which one or more chemical reactions, such as but not limited catalytic cracking reactions, may occur between one or more reactants optionally in the presence of one or more catalysts. One or more "reaction zones" may be disposed within a reactor. The term "reaction zone" refers to a volume where a particular chemical reaction takes place in a reactor.

As used in the present disclosure, the terms "separation unit" and "separator" refer to any separation device(s) that at least partially separates one or more chemical constituents in a mixture from one another. For example, a separation system selectively separates different chemical constituents from one another, forming one or more chemical fractions. Examples of separation systems include, without limitation, distillation columns, fractionators, flash drums, knock-out drums, knock-out pots, centrifuges, decanters, filtration devices, traps, scrubbers, expansion devices, membranes, solvent extraction devices, adsorption devices, chemical separators, crystallizers, chromatographs, precipitators, evaporators, driers, high-pressure separators, low-pressure separators, or combinations or these. The separation processes described in the present disclosure may not completely separate all of one chemical constituent from all of another chemical constituent. Instead, the separation processes described in the present disclosure "at least partially" separate different chemical constituents from one another and, even if not explicitly stated, separation can include only partial separation.

It should further be understood that streams may be named for the components of the stream, and the component for which the stream is named may be the major constituent of the stream (such as the constituent comprising the greatest fraction of the stream, excluding inert diluent gases, such as nitrogen, noble gases, and the like). It should also be understood that components of a stream are disclosed as passing from one system component to another when a stream comprising that component is disclosed as passing from that system component to another. For example, a disclosed "mixed butene stream" passing to a first system component or from a first system component to a second system component should be understood to equivalently disclose "mixed butenes" passing to the first system component or passing from a first system component to a second system component.

Conventional refinery systems include multiple unit operations. Steam enhanced catalytic cracking of crude oil directly can reduce the complexity of the refining process, such as by reducing the number of unit operations needed to process the crude oil. Steam enhanced catalytic cracking often comprises contacting the hydrocarbon feed with steam in the presence of a mordenite framework inverted (MFI) structured zeolite, such as ZSM-5. Steam enhanced catalytic cracking using ZSM-5 zeolites may have lower selectivity to the olefins. Without being bound by any particular theory, it is believed that ZSM-5 zeolites may have a porous structure comprising intersectional straight and sinusoidal channels, which may restrict the diffusion of light olefin reaction products out of the porous structure of the ZSM-5 zeolites.

The present disclosure is directed to steam catalytic cracking of crude oil using an MEL structured zeolite, such as a ZSM-11 zeolite, to convert the crude oil to greater value hydrocarbon products, such as but not limited to light olefins, aromatic compounds, or combinations of these. Without being bound by any particular theory, it is believed that the ZSM-11 zeolites of the present disclosure have only intersectional straight channels, not sinusoidal channels, and thereby have greater catalytic activity compared to ZSM-5 zeolites, which have both intersectional straight channels and sinusoidal channels. Thus, the light olefins reaction products may more easily exit from the porous structure of the ZSM-11 zeolites, and the present disclosure may produce greater yields of light olefins, light aromatic compounds, or both, compared to steam enhanced catalytic cracking of crude oil using a ZSM-5 zeolite. The present disclosure is also directed to the ZSM-11 zeolite and methods of making the ZSM-11 zeolite.

Referring now to FIG. 1, a process of the present disclosure for converting a hydrocarbon feed 102 to light olefins, light aromatic compounds, or both, includes contacting the hydrocarbon feed 102 with steam in the presence of a cracking catalyst 132 at reaction conditions sufficient to cause at least a portion of hydrocarbons in the hydrocarbon feed 102 to undergo one or more cracking reactions to produce a steam catalytic cracking effluent 140 comprising light olefins, light aromatic compounds, or both, where the cracking catalyst 132 comprises, consists of, or consists essentially of a ZSM-11 zeolite.

The hydrocarbon feed 102 may include one or more heavy oils, such as but not limited to crude oil, bitumen, oil sand, shale oil, coal liquids, vacuum residue, tar sands, other heavy oil streams, or combinations of these. It should be understood that, as used in this disclosure, a "heavy oil" refers to a raw hydrocarbon, such as whole crude oil, which has not been previously processed through distillation, or may refer to a hydrocarbon oil, which has undergone some degree of processing prior to being introduced to the process 100 as the hydrocarbon feed 102. The hydrocarbon feed 102 may have a density of greater than or equal to 0.80 grams per milliliter. The hydrocarbon feed 102 may have an end boiling point (EBP) of greater than 565° C. The hydrocarbon feed 102 may have a concentration of nitrogen of less than or equal to 3000 parts per million by weight (ppmw).

In embodiments, the hydrocarbon feed 102 may be a crude oil, such as whole crude oil, or synthetic crude oil. The crude oil may have an American Petroleum Institute (API) gravity of from 22 degrees to 50 degrees, such as from 22 degrees to 40 degrees, from 25 degrees to 50 degrees, or from 25 degrees to 40 degrees. For example, the hydrocarbon feed 102 may include an extra light crude oil, a light crude oil, a medium crude oil, a heavy crude oil, or combinations of these. In embodiments, the hydrocarbon feed 102 can be a light crude oil, such as but not limited to an Arab light export crude oil. Example properties for an exemplary grade of Arab light crude oil are provided in Table 1.

TABLE 1

Example of Arab Light Export Feedstock

| Analysis | Units | Value | Test Method |
|---|---|---|---|
| American Petroleum Institute (API) gravity | degree | 33.13 | ASTM D287 |
| Density | grams per milliliter (g/mL) | 0.8595 | ASTM D287 |
| Carbon Content | weight percent (wt. %) | 85.29 | ASTM D5291 |
| Hydrogen Content | wt. % | 12.68 | ASTM D5292 |
| Sulfur Content | wt. % | 1.94 | ASTM D5453 |
| Nitrogen Content | parts per million by weight (ppmw) | 849 | ASTM D4629 |
| Asphaltenes | wt. % | 1.2 | ASTM D6560 |
| Micro Carbon Residue (MCR) | wt. % | 3.4 | ASTM D4530 |
| Vanadium (V) Content | ppmw | 15 | IP 501 |
| Nickel (Ni) Content | ppmw | 12 | IP 501 |
| Arsenic (As) Content | ppmw | 0.04 | IP 501 |
| Boiling Point Distribution | | | |
| Initial Boiling Point (IBP) | Degrees Celsius (° C.) | 33 | ASTM D7169 |
| 5% Boiling Point (BP) | ° C. | 92 | ASTM D7169 |
| 10% BP | ° C. | 133 | ASTM D7169 |
| 20% BP | ° C. | 192 | ASTM D7169 |
| 30% BP | ° C. | 251 | ASTM D7169 |
| 40% BP | ° C. | 310 | ASTM D7169 |
| 50% BP | ° C. | 369 | ASTM D7169 |
| 60% BP | ° C. | 432 | ASTM D7169 |
| 70% BP | ° C. | 503 | ASTM D7169 |
| 80% BP | ° C. | 592 | ASTM D7169 |
| 90% BP | ° C. | >720 | ASTM D7169 |
| 95% BP | ° C. | >720 | ASTM D7169 |
| End Boiling Point (EBP) | ° C. | >720 | ASTM D7169 |
| BP range C5-180° C. | wt. % | 18.0 | ASTM D7169 |
| BP range 180° C.-350° C. | wt. % | 28.8 | ASTM D7169 |
| BP range 350° C.-540° C. | wt. % | 27.4 | ASTM D7169 |
| BP range >540° C. | wt. % | 25.8 | ASTM D7169 |

Weight percentages in Table 1 are based on the total weight of the crude oil

In embodiments, the hydrocarbon feed 102 may be an Arab Extra Light (AXL) crude oil. An example boiling point distribution for an exemplary grade of an AXL crude oil is provided in Table 2.

TABLE 2

| Property | Units | Value | Test Method |
|---|---|---|---|
| 0.1% Boiling Point (BP) | ° C. | 21 | ASTM D7169 |
| | ° C. | | |
| 5% BP | ° C. | 65 | ASTM D7169 |
| 10% BP | ° C. | 96 | ASTM D7169 |
| 15% BP | ° C. | 117 | ASTM D7169 |
| 20% BP | ° C. | 141 | ASTM D7169 |
| 25% BP | ° C. | 159 | ASTM D7169 |
| 30% BP | ° C. | 175 | ASTM D7169 |
| 35% BP | ° C. | 196 | ASTM D7169 |
| 40% BP | ° C. | 216 | ASTM D7169 |
| 45% BP | ° C. | 239 | ASTM D7169 |
| 50% BP | ° C. | 263 | ASTM D7169 |
| 55% BP | ° C. | 285 | ASTM D7169 |
| 60% BP | ° C. | 308 | ASTM D7169 |
| 65% BP | ° C. | 331 | ASTM D7169 |
| 70% BP | ° C. | 357 | ASTM D7169 |
| 75% BP | ° C. | 384 | ASTM D7169 |
| 80% BP | ° C. | 415 | ASTM D7169 |
| 85% BP | ° C. | 447 | ASTM D7169 |
| 90% BP | ° C. | 486 | ASTM D7169 |
| 95% BP | ° C. | 537 | ASTM D7169 |
| End Boiling Point (EBP) | ° C. | 618 | ASTM D7169 |

When the hydrocarbon feed 102 comprises a crude oil, the crude oil may be a whole crude or may be a crude oil that has undergone at some processing, such as desalting, solids separation, scrubbing, or other process that does not change the composition of the hydrocarbons of the crude oil. For example, the hydrocarbon feed 102 may be a de-salted crude oil that has been subjected to a de-salting process. In embodiments, the hydrocarbon feed 102 may include a crude oil that has not undergone pretreatment, separation (such as distillation), or other operation or process that changes the hydrocarbon composition of the crude oil prior to introducing the crude oil to the system 100.

In embodiments, the hydrocarbon feed 102 can be a crude oil having a boiling point profile as described by the 5 wt. % boiling temperature, the 25 wt. % boiling temperature, the 50 wt. % boiling temperature, the 75 wt. % boiling temperature, and the 95 wt. % boiling temperature. These respective boiling temperatures correspond to the temperatures at which a given weight percentage of the hydrocarbon feed stream boils. In embodiments, the crude oil may have one or more of a 5 wt. % boiling temperature of less than or equal to 150° C.; a 25 wt. % boiling temperature of less than or equal to 225° C. or less than or equal to 200° C.; a 50 wt. % boiling temperature of less than or equal to 500° C., less than or equal 450° C., or less than or equal to 400° C.; a 75 wt. % boiling temperature of less than 600° C., less than or equal to 550° C.; a 95 wt. % boiling temperature of greater than or equal to 550° C. or greater than or equal to 600° C.; or combinations of these. In embodiments, the crude oil may have one or more of a 5 wt. % boiling temperature of from 0° C. to 100° C.; a 25 wt. % boiling temperature of from 150° C. to 250° C., a 50 wt. % boiling temperature of from 250° C. to 400° C., a 75 wt. % boiling temperature of from 350° C. to 600° C. and an end boiling point temperature of from 500° C. to 1000° C., such as from 500° C. to 800° C.

Referring again to FIG. 1, one embodiment of a steam catalytic cracking system 110 for steam catalytic cracking a hydrocarbon feed 102 is schematically depicted. The steam catalytic cracking system 110 may include at least one steam catalytic cracking reactor 130. The steam catalytic cracking reactor 130 may include one or more fixed bed reactors, fluid bed reactors, batch reactors, fluid catalytic cracking (FCC) reactors, moving bed catalytic cracking reactors, or combinations of these. In embodiments, the steam catalytic cracking reactor 130 may be a fixed bed reactor. In embodiments, the steam catalytic cracking reactor 130 may include a plurality of fixed bed reactors operated in a swing mode. Operation of the steam catalytic cracking reactor 130 will be described herein in the context of a fixed bed reactor. However, it is understood that other types of reactors, such as a fluid bed reactors, batch reactors, FCC reactors, or moving bed reactors, may also be used to contact the hydrocarbon feed 102 with steam in the presence of the cracking catalyst to conduct the steam catalytic cracking of the process disclosed herein.

The steam catalytic cracking reactor 130 may operate to contact the hydrocarbon feed 102 with steam in the presence of the cracking catalyst of the present disclosure to produce a steam catalytic cracking effluent 140 comprising light olefins, light aromatic compounds, or combinations of these. As previously discussed, the steam catalytic cracking reactor 130 may be a fixed bed catalytic cracking reactor that may include the cracking catalyst 132 disposed within a steam catalytic cracking zone 134. The steam catalytic cracking reactor 130 may include a porous packing material 136, such as silica carbide packing, upstream of the steam catalytic cracking zone 134. The porous packing material 136 may ensure sufficient heat transfer to the hydrocarbon feed 102 and steam prior to conducting the steam catalytic cracking reaction in the steam catalytic cracking zone 134.

Referring again to FIG. 1, the hydrocarbon feed 102 may be introduced to the steam catalytic cracking reactor 130. In embodiments, the hydrocarbon feed 102 may be introduced directly to the steam catalytic cracking system 110, such as by passing the crude oil of the hydrocarbon feed 102 to the steam catalytic cracking reactor 130 without passing the hydrocarbon feed 102 to any separation system or unit operation that changes the hydrocarbon composition of the hydrocarbon feed 102. In embodiments, the hydrocarbon feed 102 may be processed upstream of the steam catalytic cracking system 110 to remove contaminants, such as but not limited to nitrogen compounds, sulfur-containing compounds, heavy metals, or other contaminants that may reduce the effectiveness of the cracking catalyst 132.

The processes disclosed herein can include introducing the hydrocarbon feed 102 to the steam catalytic cracking system 110, such as introducing the hydrocarbon feed 102 to the steam catalytic cracking reactor 130. Introducing the hydrocarbon feed 102 to the steam catalytic cracking reactor 130 may include heating the hydrocarbon feed 102 to a temperature of from 35° C. to 150° C. and then passing the hydrocarbon feed 102 to the steam catalytic cracking reactor 130. In embodiments, the hydrocarbon feed 102 may be heated to a temperature of from 40° C. to 150° C., from 45° C. to 150° C., from 50° C. to 150° C., from 35° C. to 145° C., from 40° C. to 145 ° C., from 45° C. to 145° C., from 35° C. to 140° C., from 40° C. to 140° C., or from 45° C. to 140° C.

In embodiments, passing the hydrocarbon feed 102 to the steam catalytic cracking reactor 130 may include passing the hydrocarbon feed 102 to a feed pump 104, where the feed pump 104 may increase the pressure of the hydrocarbon feed 102 and convey the hydrocarbon feed 102 to the steam catalytic cracking reactor 130. The flowrate of the feed pump 104 may be adjusted so that the hydrocarbon feed 102 is injected into the steam catalytic cracking reactor 130 at a gas hourly space velocity (GHSV) of greater than or equal to 0.1 per hour ($h^{-1}$) or greater than or equal to 0.25 $h^{-1}$. The hydrocarbon feed 102 may be injected into the steam catalytic cracking reactor 130 at a GHSV of less than or equal to 50 $h^{-1}$, less than or equal to 25 $h^{-1}$, less than or equal to 20 $h^{-1}$, less than or equal to 14 $h^{-1}$, less than or equal to 9$h^{-1}$, or less than or equal to 5 $h^{-1}$. The hydrocarbon feed 102 may be injected into the steam catalytic cracking reactor 130 at a GHSV of from 0.1 $h^{-1}$ to 50 $h^{-1}$, from 0.1 $h^{-1}$ to 25 $h^{-1}$, from 0.1 $h^{-1}$ to 20 $h^{-1}$, from 0.1 $h^{-1}$ to 14 $h^{-1}$, from 0.1 $h^{-1}$ to 9$h^{-1}$, from 0.1$h^{-1}$ to 5 $h^{-1}$, from 0.1 $h^{-1}$ to 4 $h^{-1}$, from 0.25 $h^{-1}$ to 50 $h^{-1}$, from 0.25 $h^{-1}$ to 25 $h^{-1}$, from 0.25 $h^{-1}$ to 20 $h^{-1}$, from 0.25 $h^{-1}$ to 14 $h^{-1}$, from 0.25 $h^{-1}$ to 9 $h^{-1}$, from 0.25 $h^{-1}$ to 5 $h^{-1}$, from 0.25 $h^{-1}$ to 4 $h^{-1}$, from 1 $h^{-1}$ to 50 $h^{-1}$, from 1 $h^{-1}$ to 25 $h^{-1}$, from 1 $h^{-1}$ to 20 $h^{-1}$, from 1 $h^{-1}$ to 14 $h^{-1}$, from 1 $h^{-1}$ to 9 $h^{-1}$, or from 1 $h^{-1}$ to 5 $h^{-1}$ via feed inlet line 106. The hydrocarbon feed 102 may be further pre-heated in the feed inlet line 106 to an inlet temperature of from 100° C. to 250° C. before injecting the hydrocarbon feed 102 into the steam catalytic cracking reactor 130.

Water 120 may be injected into the steam catalytic cracking reactor 130 through water feed line 122 via the water feed pump 124. The water feed line 122 may be pre-heated to heat the water 120 to a temperature of from 50° C. to 175° C., from 50° C. to 150° C., from 60° C. to 175° C., or from 60° C. to 170° C. The water 120 may be converted to steam in water feed line 122 or upon contact with the hydrocarbon feed 102 in the steam catalytic cracking reactor 130. The flowrate of the water feed pump 124 may be adjusted to deliver the water 120 (liquid, steam, or both) to the steam catalytic cracking reactor 130 at a flow rate equivalent to a GHSV of greater than or equal to 0.1 $h^{-1}$, greater than or equal to 0.5 $h^{-1}$, greater than or equal to 1 $h^{-1}$, greater than or equal to 5 $h^{-1}$, greater than or equal to 6 $h^{-1}$, greater than or equal to 10 $h^{-1}$, or even greater than or equal to 15 $h^{-1}$. The water 120 may be introduced to the steam catalytic cracking reactor 130 at a flow rate equivalent to a GHSV of less than or equal to 100 $h^{-1}$, less than or equal to 75 $h^{-1}$, less than or equal to 50 $h^{-1}$, less than or equal to 30 $h^{-1}$, or less than or equal to 20 $h^{-1}$. The water 120 may be introduced to the steam catalytic cracking reactor 130 at a flow rate equivalent to a GHSV of from 0.1 $h^{-1}$ to 100 $h^{-1}$, from 0.1 $h^{-1}$ to 75 $h^{-1}$, from 0.1 $h^{-1}$ to 50 $h^{-1}$, from 0.1 $h^{-1}$ to 30 $h^{-1}$, from 0.1 $h^{-1}$ to 20 $h^{-1}$, from 1 $h^{-1}$ to 100 $h^{-1}$, from 1 $h^{-1}$ to 75 $h^{-1}$, from 1 $h^{-1}$ to 50 $h^{-1}$, from 1 $h^{-1}$ to 30 $h^{-1}$, or from 1 $h^{-1}$ to 20 $h^{-1}$.

The steam from injection of the water 120 into the steam catalytic cracking reactor 130 may reduce the hydrocarbon partial pressure, which may have the dual effects of increasing yields of light olefins (e.g., ethylene, propylene and butylene) as well as reducing coke formation on the cracking catalyst. Not intending to be limited by any particular theory, it is believed that light olefins like propylene and butenes are mainly generated from catalytic cracking reactions following the carbonium ion mechanism, and as these are intermediate products, they can undergo secondary reactions such as hydrogen transfer and aromatization (leading to coke formation). The steam may increase the yield of light olefins by suppressing these secondary bi-molecular reactions, and may reduce the concentration of reactants and products, which favor selectivity towards light olefins. The steam may also suppress secondary reactions that are responsible for coke formation on catalyst surface, which is good for catalysts to maintain high average activation.

The mass flow rate of the water 120 to the steam catalytic cracking reactor 130 may be less than the mass flow rate of the hydrocarbon feed 102 to the steam catalytic cracking reactor 130. In embodiments, a mass flow ratio of the water 120 to the hydrocarbon feed 102 introduced to the steam catalytic cracking reactor 130 can be less than 1, such as less than or equal to 0.9, less than or equal to 0.8, less than or equal to 0.7, or less than or equal to 0.6. In embodiments, the mass flow ratio of the water 120 to the hydrocarbon feed 102 introduced to the steam catalytic cracking reactor 130 can be from 0.2 to less than 1, from 0.2 to 0.9, from 0.2 to 0.8, from 0.2 to 0.7, from 0.2 to 0.6, from 0.3 to less than 1, from 0.3 to 0.9, from 0.3 to 0.8, from 0.3 to 0.7, from 0.3 to 0.6, from 0.4 to less than 1, from 0.4 to 0.9, from 0.4 to 0.8, from 0.4 to 0.7, from 0.4 to 0.6, from 0.5 to less than 1, from 0.5 to 0.9, from 0.5 to 0.8, from 0.5 to 0.7, from 0.5 to 0.6. The mass flow ratio of water to hydrocarbon feed 102 is equal to the mass flow rate of the water 120 to the steam catalytic cracking reactor 130 divided by the mass flow rate of the hydrocarbon feed 102 to the steam catalytic cracking reactor 130. In embodiments, the mass flow ratio of the water 120 to the hydrocarbon feed 102 introduced to the steam catalytic cracking reactor 130 can be about 0.5. The water may be present as steam in the steam catalytic cracking reactor 130.

Referring again to FIG. 1, the steam catalytic cracking system 110 may be operable to contact the hydrocarbon feed 102 with steam (from water 120) in the presence of the cracking catalyst 132 in the steam catalytic cracking reactor 130 under reaction conditions sufficient to cause at least a portion of the hydrocarbons from the hydrocarbon feed 102 to undergo one or more cracking reactions to produce a steam catalytic cracking effluent 140 comprising light olefins, light aromatic compounds, or both. In embodiments, the steam catalytic cracking effluent 140 may comprise light olefins, which may include but are not limited to ethylene, propylene, butenes, or combinations of these. In embodiments, the steam catalytic cracking effluent 140 may comprise light aromatic compounds, which refers to compounds containing an aromatic ring structure and having less than or equal to 10 carbon atoms. The light aromatic compounds in the steam catalytic cracking effluent 140 may include but are not limited to benzene, toluene, ethylbenzene, xylenes, or other light aromatic compounds.

The steam catalytic cracking reactor 130 may be operated at a temperature of greater than or equal to 525° C., greater than or equal to 550° C., greater than or equal to 575° C., or even greater than or equal to 600° C. The steam catalytic cracking reactor 130 may be operated at a temperature of less than or equal to 800° C., less than or equal to 750° C., less than or equal to 700° C., or even less than or equal to 675° C. The steam catalytic cracking reactor 130 may be operated at a temperature of from 525° C. to 800° C., from 525° C. to 750° C., from 525° C. to 700° C., from 525° C. to 675° C., from 550° C. to 750° C., from 550° C. to 700° C., from 550° C. to 675° C., from 575° C. to 750° C., from 575° C. to 700° C., from 575° C. to 675° C., from 600° C. to 750° C., from 600° C. to 700° C., or from 600° C. to 675° C. In embodiments, the steam catalytic cracking reactor 130 may be operated at a temperature of about 675° C. The process may operate at atmospheric pressure (approximately from 1 to 2 bar).

The methods of the present disclosure may include contacting the hydrocarbon feed 102 with the steam (water 120) in the presence of the cracking catalyst 132 in the steam catalytic cracking reactor 130 for a residence time sufficient to convert at least a portion of the hydrocarbon compounds in the hydrocarbon feed 102 to light olefins, light aromatic compounds, or both. In embodiments, the methods may include contacting the hydrocarbon feed 102 with the steam (water 120) in the presence of the cracking catalyst 132 in the steam catalytic cracking reactor 130 for a residence time of from 1 second to 60 seconds, such as from 1 second to 30 seconds, from 1 second to 10 seconds, or about 10 seconds.

When the steam catalytic cracking reactor 130 is a fixed bed reactor, the steam catalytic cracking reactor 130 may be operated in a semi-continuous manner. For example, during a conversion cycle, the steam catalytic cracking reactor 130 may be operated with the hydrocarbon feed 102 and water 120 flowing to the steam catalytic cracking reactor 130 for a period of time. After the period of the time, the cracking catalyst may be regenerated. Each conversion cycle of the steam catalytic cracking reactor 130 may be from 2 to 24 hours, from 2 to 20 hours, from 2 to 16 hours, from 2 to 12 hours, from 2 to 10 hours, from 2 to 8 hours, from 4 to 24 hours, from 4 to 20 hours, from 4 to 16 hours, from 4 to 12 hours, from 4 to 10 hours, from or 4 to 8 hours before switching off the feed pump 104 and the water feed pump 124 to cease the flow of hydrocarbon and steam to the steam catalytic cracking reactor 130.

At the end of the conversion cycle, the flow of hydrocarbon feed 102 and water 120 may be stopped and the cracking catalyst 132 may be regenerated during a regeneration cycle. In embodiments, the steam catalytic cracking system 110 may include a plurality of fixed bed steam catalytic cracking reactors 130, which may be operated in parallel or in series. In embodiments, the steam catalytic cracking system 110 may include 1, 2, 3, 4, 5, 6, or more than 6 steam catalytic cracking reactors 130, which may be operated in series or in parallel. With a plurality of steam catalytic cracking reactors 130 operating in parallel, one or more of the steam catalytic cracking reactors 130 can continue in a conversion cycle while one or more of the other steam catalytic cracking reactors 130 can be taken off-line for regeneration of the cracking catalyst 132, thus maintaining continuous operation of the steam catalytic cracking system 110.

Referring again to FIG. 1, during a regeneration cycle, the steam catalytic cracking reactor 130 may be operated to regenerate the cracking catalyst 132. The cracking catalyst 132 may be regenerated to remove coke deposits accumulated during the conversion cycle. To regenerate the cracking catalyst 132, hydrocarbon gas and liquid products produced by the steam catalytic cracking process may be evacuated from the steam catalytic cracking reactor 130. Nitrogen gas may be introduced to the steam catalytic cracking reactor 130 through gas inlet line 112 to evacuate the hydrocarbon gas and liquid products from the fixed bed steam catalytic cracking reactor 130. Nitrogen may be introduced to the steam catalytic cracking reactor 130 at gas hourly space velocity of from 10 per hour ($h^{-1}$) to 100 $h^{-1}$.

Following evacuation of the hydrocarbon gases and liquids, air may be introduced to the steam catalytic cracking reactor 130 through the gas inlet line 112 at a gas hourly space velocity of from 10 $h^{-1}$ to 100 $h^{-1}$. The air may be passed out of the steam catalytic cracking reactor 130 through air outlet line 142. While passing air through the cracking catalyst 132 in the steam catalytic cracking reactor 130, the temperature of the steam catalytic cracking reactor 130 may be increased from the reaction temperature to a regeneration temperature of from 650° C. to 750° C. for a period of from 3 hours to 5 hours. The gas produced by air regeneration of the cracking catalyst 132 may be passed out of the steam catalytic cracking reactor 130 and may be analyzed by an in-line gas analyzer to detect the presence or concentration of carbon dioxide produced through de-coking of the cracking catalyst 132. Once the carbon dioxide concentration in the gases passing out of the steam catalytic cracking reactor 130 are reduced to less than 0.05% to 0.1% by weight, as determined by the in-line gas analyzer, the temperature of the steam catalytic cracking reactor 130 may be decreased from the regeneration temperature back to the reaction temperature. The air flow through gas inlet line 112 may be stopped. Nitrogen gas may be passed through the cracking catalyst 132 for 15 to 30 minutes to remove air from the steam catalytic cracking reactor 130. Following treatment with nitrogen, the flows of the hydrocarbon feed 102 and water 120 may be resumed to begin another conversion cycle of steam catalytic cracking reactor 130. Although described herein in the context of a fixed bed reactor system, it is understood that the steam catalytic cracking reactor 130 can be a different type of reactor, such as a fluidized bed reactor, a moving bed reactor, a batch reactor, an FCC reactor, or combinations of these.

Referring again to FIG. 1, the steam catalytic cracking effluent 140 may pass out of the steam catalytic cracking reactor 130. The steam catalytic cracking effluent 140 may include one or more products and intermediates, such as but not limited to light hydrocarbon gases, light olefins, light aromatic compounds, pyrolysis oil, or combinations of these. The light olefins in the steam catalytic cracking effluent 140 may include ethylene, propylene, butenes, or combinations of these.

As previously discussed, the cracking catalyst comprises, consists of, or consists essentially of a ZSM-11 zeolite. In embodiments, the cracking catalyst may comprise primarily ZSM-11 zeolite and may include less than or equal to 30%, less than equal to 28%, or less than or equal to 25% zeolite crystalline structures characteristic of ZSM-5 zeolite. In embodiments, the cracking catalyst may include the ZSM-11 zeolite catalyst without any other catalytic species impregnated into pores of the ZSM-11 zeolite, deposited onto the surface of the ZSM-11 zeolite, or otherwise incorporated into the ZSM-11 zeolite. In embodiments, the ZSM-11 zeolite may be substantially free of impregnated metals, metalloids, or oxides thereof, such as having less than or equal to 0.1 wt.% or less than or equal to 0.01 wt.% impregnated metals, metalloids, or oxides thereof based on the total weight of the ZSM-11 zeolite.

Figure 2:
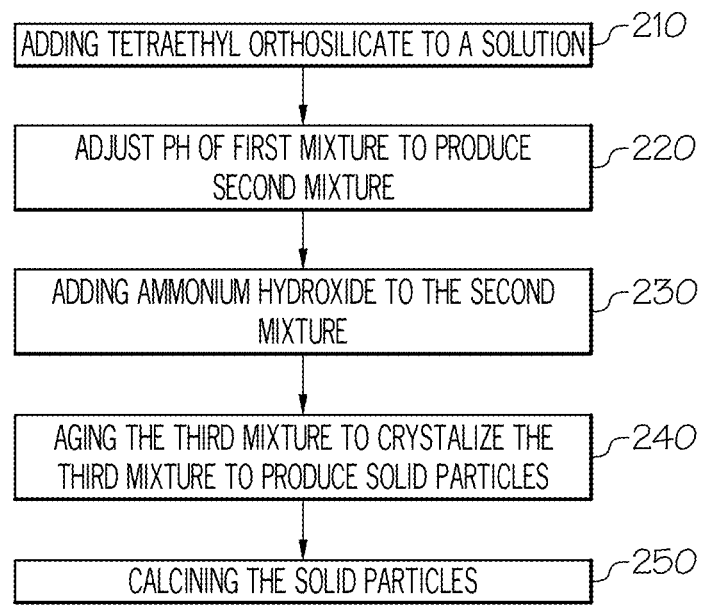
FIG. 2 depicts a flowchart of a method for producing a cracking catalyst comprising a ZSM-11 zeolite, according to one or more embodiments shown and described in the present disclosure.

Referring now to FIG. 2, a process 200 for preparing the ZSM-11 zeolite may include adding tetraethyl orthosilicate to a solution comprising $Al(NO_3)_3 \cdot 9H_2O$ and water to produce a first mixture, in step 210; adding metal hydroxide to the first mixture to produce a second mixture, in step 220; adding ammonium hydroxide to the second mixture to produce a third mixture, in step 230; aging the third mixture at a temperature of from 100° C. to 300° C. for a time period sufficient to crystalize the third mixture to produce solid particles, in step 240; and calcining the solid particles at a temperature of from 400° C. to 800° C. for 1 to 12 hours, in step 250.

In step 210, tetraethyl orthosilicate may be added to a solution comprising $Al(NO_3)_3 \cdot 9H_2O$ and water to produce a first mixture. In embodiments, a concentration of tetraethyl orthosilicate in the first mixture may be from 55 weight percent (wt. %) to 70 wt. %, from 60 wt. % to 70 wt. %, from 55 wt. % to 65 wt. %, or from 60 wt. % to 65 wt. % based on the total weight of the first mixture. In embodiments, a concentration of $Al(NO_3)_3 \cdot 9H_2O$ in the first mixture may be from 2 wt. % to 10 wt. %, from 3 wt. % to 10 wt. %, from 2 wt. % to 8 wt. %, or from 3 wt. % to 8 wt. % based on the total weight of the first mixture. The balance of the first mixture may be water. In embodiments, a concentration of water in the first mixture may be from 25 wt. % to 40 wt. %, from 30 wt. % to 40 wt. %, from 25 wt. % to 35 wt. %, or from 30 wt. % to 35 wt. % based on the total weight of the first mixture. Adding the tetraethyl orthosilicate to the first mixture may include one or more of stirring, swirling, vortexing, shaking, sonicating, homogenizing, blending, or the like for a period of time sufficient to produce a homogeneous first mixture.

In step 220, the pH of the first mixture may be adjusted to produce a second mixture. In particular, the pH of the first mixture may be increased by adding a basic solution to the first mixture. In embodiments, the basic solution may be a solution of a strong base in water. The strong base may include one or a combination of alkali metal hydroxides, alkaline earth metal hydroxides, or combinations thereof In embodiments, the strong base may include, but is not limited to one or more of lithium hydroxide (LiOH), sodium hydroxide (NaOH), potassium hydroxide (KOH), rubidium hydroxide (RbOH), magnesium hydroxide ($Mg(OH)_2$), calcium hydroxide ($Ca(OH)_2$), strontium hydroxide ($Sr(OH)_2$), barium hydroxide ($Ba(OH)_2$), or combinations thereof. In embodiments, the strong base may be sodium hydroxide (NaOH).

The basic solution may comprise a concentration of the strong base sufficient to adjust the pH of the first mixture into the target pH range to produce the second mixture. In embodiments, the basic solution may comprise from 1 wt. % to 5 wt. %, from 2 wt. % to 5 wt. %, from 1 wt. % to 3 wt. %, or from 2 wt. % to 3 wt. % strong base based on the total weight of the basic solution. In embodiments, the basic solution may comprise water and sodium hydroxide at a concentration of from 1 wt. % to 5 wt. %, from 2 wt. % to 5 wt. %, from 1 wt. % to 3 wt. %, or from 2 wt. % to 3 wt. % NaOH based on the total weight of the basic solution. The basic solution may be added dropwise to the first mixture. In embodiments, the first mixture may be mixed or agitated while adding the basic solution dropwise to the first mixture. Mixing or agitating may include, but is not limited to, one or more of stirring, swirling, vortexing, shaking, sonicating, homogenizing, blending, or the like.

The amount of the basic solution added to the first mixture may be sufficient so that the second mixture produced therefrom has a concentration of the strong base of from 0.3 wt. % to 0.7 wt. %, from 0.4 wt. % to 0.7 wt. %, from 0.3 wt. % to 0.6 wt. %, or from 0.4 wt. % to 0.6 wt. % based on the total weight of the second mixture. The pH of the second mixture may be from 7 to 14, from 8 to 14, from 9 to 14, from 7 to 13, from 8 to 13, or from 9 to 13.

In step 230, an ammonium hydroxide may be added to second mixture to produce a third mixture. In embodiments, ammonium hydroxide may be an alkyl ammonium hydroxide, such as but not limited to tetra-methyl ammonium hydroxide, tetra-propyl ammonium hydroxide, tetra-butyl ammonium hydroxide, or combinations of these ammonium hydroxide compounds. In embodiments, a concentration of the alkyl ammonium hydroxide in the third mixture may be from 35 wt. % to 50 wt. %, from 40 wt. % to 50 wt. %, from 35 wt. % to 45 wt. %, or from 40 wt. % to 45 wt. % based on the total weight of the third mixture. The alkyl ammonium hydroxide may be added to the second mixture while mixing or agitating the second mixture to produce the third mixture. Mixing or agitating the second mixture while adding the alkyl ammonium hydroxide may include, but is not limited to, one or more of stirring, swirling, vortexing, shaking, sonicating, homogenizing, blending, or the like. In embodiments, after adding the alkyl ammonium hydroxide, the third mixture may be mixed or agitated for a time period of from 1 hour to 5 hours, such as from 2 hours to 4 hours, or about 3 hours.

In step 240, the third mixture may be hydrothermally treated at a temperature of from 100° C. to 300° C. for a period of time sufficient to crystalize the third mixture to produce solid particles. In embodiments, the third mixture may be hydrothermally treated at a temperature of from 100° C. to 300° C., from 100° C. to 200° C., from 120° C. to 300° C., from 120° C. to 200° C., or 170° C. The third mixture may be aged at a time period of from 1 day to 10 days, from 1 day to 8 days, from 2 days to 10 days, from 2 days to 8 days, or about 6 days at the hydrothermal treatment temperature. The third mixture may be hydrothermally treated in a TEFLON®-lined rotating autoclave.

In embodiments, a process 200 for preparing the ZSM-11 zeolite may further include filtering the solid particles from the third mixture (not shown in FIG. 2). Other solid-liquid separation processes can be used in combination with or as an alternative to filtering. Other solid-liquid separation processes can include but are not limited to decantation, vacuum filtration, centrifugation, or combinations of these separation processes. In embodiments, a process 200 for preparing the ZSM-11 zeolite may further include washing the solid particles with water, such as distilled water or deionized water, to remove residual reagents of the third mixture from the solid particles (not shown in FIG. 2).

In embodiments, a process 200 for preparing the ZSM-11 zeolite may further include drying the solid particles at a temperature of from 50° C. to 200° C. (not shown in FIG. 2). In embodiments, the solid particles may be dried at a temperature of from 50° C. to 200° C., from 50° C. to 100° C., from 70° C. to 200° C., from 70° C. to 100° C., or 90° C. In some embodiments, the solid particles may be dried overnight.

In step 250, the solid particles may be calcined at a temperature of from 400° C. to 800° C. for 1 to 12 hours to produce the ZSM-11 zeolite. In embodiments, the solid particles may be calcined at a temperature of from 400° C. to 800° C., from 400° C. to 600° C., from 500° C. to 800° C., from 500° C. to 600° C., or 550° C. In embodiments, the solid particles may be calcined at a time period of from 1 hour to 12 hours, from 1 hour to 10 hours, from 2 hours to 12 hours, from 2 hours to 10 hours, or 8 hours.

In embodiments, the ZSM-11 zeolite can be ion-exchanged to produce the hydrogen form of the ZSM-11 zeolite. In hydrogen form, the Brønsted acid sites in the zeolite, also known as bridging OH—H groups, may form hydrogen bonds with other framework oxygen atoms in the zeolite framework. In embodiments, the method of producing the ZSM-11 zeolite may include ion-exchanging the ZSM-11 zeolite to produce the hydrogen form of the ZSM-11 zeolite. In embodiments, ion-exchanging the ZSM-11 zeolite may include treating ZSM-11 zeolite with an ammonium salt at a temperature of from 50° C. to 100° C. for a duration of from 1 hour to 12 hours. In embodiments, the ZSM-11 zeolite may be treated with a 1.0 molar (M) ammonium nitrate ($NH_4NO_3$) solution. In embodiments, the ZSM-11 zeolite may be treated with a 0.25 normal (N) ammonium nitrate solution In embodiments, the ZSM-11 zeolite may be treated with the ammonium salt solution at a temperature of from 50° C. to 100° C., from 50° C. to 90° C., from 70° C. to 100° C., from 70° C. to 90° C., or 80° C. In embodiments, the ZSM-11 zeolite may be treated with the ammonium salt solution for a time period of from 1 hour to 12 hours, from 1 hour to 8 hours, from 2 hours to 12 hours, from 2 hours to 8 hours, or 4.5 hours. In embodiments, the ZSM-11 zeolite may be treated with the ammonium salt solution by stirring for 4.5 hours at 80° C. In embodiments, after the ZSM-11 zeolite is treated, the ZSM-11 zeolite may be in hydrogen form.

In embodiments, the ion-exchanged hydrogen form of the ZSM-11 zeolite may be calcined at a temperature of from 400° C. to 800° C., from 400° C. to 600° C., from 500° C. to 800° C., from 500° C. to 600° C., or 550° C. In embodiments, the ion-exchanged hydrogen form of the ZSM-11 zeolite can be re-calcined at a time period of from 1 hour to 12 hours, from 1 hour to 8 hours, from 2 hours to 12 hours, from 2 hours to 8 hours, or 5 hours. In embodiments, calcining the ion-exchanged hydrogen form of the ZSM-11 zeolite may be conducted after the ion-exchange process is completed.

The ZSM-11 zeolite can have a molar ratio of silica to alumina of greater than or equal to 10 or greater than or equal to 20. The ZSM-11 zeolite can have a molar ratio of silica to alumina of less than or equal to 1500, such as less than or equal to 900, less than or equal to 600, or even less than or equal to 300. In embodiments, the ZSM-11 zeolite can have a molar ratio of silica to alumina of from 10 to 1500, such as from 10 to 900, from 10 to 600, from 10 to 300, from 20 to 1500, from 20 to 900, from 20 to 600, or from 20 to 300.

The ZSM-11 zeolite may be in the form of a plurality of particles. In embodiments, the ZSM-11 zeolite may have an average crystal size of greater than the average crystal size of a commercially-available ZSM-5 zeolite with the same silica to alumina molar ratio. In embodiments, the ZSM-11 zeolite may have an average crystal size of greater than or equal to 150 nanometers (nm), such as from 160 nm to 1000 nm, from 160 nm to 950 nm from 160 nm to 900 nm from 190 nm to 1000 nm, from 190 nm to 950 nm, from 190 nm to 900 nm, from 190 nm to 800 nm, from 190 nm to 700 nm, from 190 nm to 250 nm, from 210 nm to 1000 nm, from 210 nm to 950 nm, from 210 nm to 900 nm, from 210 nm to 800 nm, from 800 nm to 1000 nm, from 900 nm to 1000 nm, or from 900 nm to 950 nm. The average crystal size is determined by scanning electron microscopy (SEM) according to known methods.

As previously discussed, the ZSM-11 zeolite of the present disclosure has intersectional straight channels. The ZSM-11 zeolite of the present disclosure does not have sinusoidal channels. Not intending to be limited by any particular theory, it is believed that the presence of the intersectional straight channels without sinusoidal channels can shorten the diffusion path length in the ZSM-11 zeolite leading to an improved transport of reactants and reaction products to and from active reaction sites and, thus, a more efficient use of ZSM-11 as a catalyst. The shortened diffusion path length means that target products like light olefins may be less susceptible to secondary side reactions, such as but not limited to hydrogenation or oligomerization. Increased molecular transport within the ZSM-11 zeolite of the present disclosure may allow the light olefins exit easily from ZSM-11.

In embodiments, the ZSM-11 zeolite may have an average BET surface area of greater than the average BET surface area of a commercially-available ZSM-5 zeolite with the same silica to alumina molar ratio. In embodiments, the ZSM-11 zeolite may have an average surface area of from 200 square meter per gram ($m^2/g$) to 4390 $m^2/g$, from 200 $m^2/g$ to 380 $m^2/g$, from 200 $m^2/g$ to 370 $m^2/g$, from 250 $m^2/g$ to 390 $m^2/g$, from 250 $m^2/g$ to 380 $m^2/g$, from 250 $m^2/g$ to 370 $m^2/g$, from 300 $m^2/g$ to 390 $m^2/g$, from 300 $m^2/g$ to 380 $m^2/g$, or from 300 $m^2/g$ to 370 $m^2/g$. The average surface area is determined according to the Brunauer-Emmett-Teller (BET) method based on nitrogen adsorption at −195° C. performed on an AUTOSORB-1 instrument obtained from Quanta Chrome. The average surface area may be referred to throughout the present disclosure as the BET surface area.

In embodiments, the ZSM-11 zeolite may have an average pore size greater than the average pore size of a commercially-available ZSM-5 zeolite with the same silica to alumina molar ratio. The average pore size may be the average pore diameter for pores with a generally cylindrical cross-section. The ZSM-11 zeolite may have an average pore diameter of from 4 nanometers (nm) to 30 nm, from 5 nm to 30 nm, from 4 nm to 25 nm, from 5 nm to 25 nm, from 4 nm to 20 nm, from 5 nm to 20 nm, from 4 nm to 15 nm, or from 5 nm to 15 nm. The average pore diameter is determined by scanning electron microscopy (SEM) according to known methods. The average pore diameter of the ZSM-11 zeolite may have a narrow pore size distribution. In embodiments, the ZSM-11 may have a pore size distribution of less than 5 nm, or less than or equal to 4 nm. In embodiments, a standard deviation in the average pore diameter of the ZSM-11 zeolite may be less than 4 nm.

The ZSM-11 zeolite may have an average pore volume of from 0.1 square centimeter per gram ($cm^3/g$) to 1.0 $cm^3/g$, from 0.15 $cm^3/g$ to 1.0 $cm^3/g$, from 0.1 $cm^3/g$ to 0.5 $cm^3/g$, or 0.15 $cm^3/g$ to 0.5 $cm^3/g$. The total pore volume is determined from measured gas adsorption isotherms through Barrett-Joyner-Halenda Model.

The ZSM-11 zeolite may have a total acidity of from 0.100 mmol $NH_3$ per gram to 0.300 mmol $NH_3$ per gram, from 0.150 mmol $NH_3$ per gram to 0.300 mmol $NH_3$ per gram, from 0.200 mmol $NH_3$ per gram to 0.300 mmol $NH_3$ per gram, from 0.100 mmol $NH_3$ per gram to 0.250 mmol $NH_3$ per gram, from 0.150 mmol $NH_3$ per gram to 0.250 mmol $NH_3$ per gram, or from 0.200 mmol $NH_3$ per gram to 0.250 mmol $NH_3$ per gram. The a total acidity may be measured by $NH_3$-TPD measurement.

In embodiments, the ZSM-11 zeolite does not exhibit x-ray diffraction peaks corresponding to a 051 zeolite crystalline structure, a 151 zeolite crystalline structure, or a 133 zeolite crystalline structure, which are characteristic of ZSM-5 zeolite crystalline structures. This indicates that the synthesized ZSM-11 zeolite has a low concentration of crystalline structures characteristic of ZSM-5 zeolite or does not include any crystalline structures that are characteristic of ZSM-5 zeolites. In embodiments, the ZSM-11 zeolite may include less than 30 wt. % ZSM-5 crystalline structures based on the total weight of the ZSM-11 zeolite. In embodiments, the ZSM-11 zeolite may have less than or equal to 25 wt. %, less than or equal to 20 wt. %, less than or equal to 15 wt. %, or even less than or equal to 10 wt. % ZSM-5 crystalline structures based on the total weight of the ZSM-11 zeolite.

In embodiments, the cracking catalyst can include the ZSM-11 zeolite without any other catalytic species impregnated onto or otherwise deposited onto the surfaces of the ZSM-11 zeolite or into the pores of the ZSM-11 zeolite. In embodiments, the ZSM-11 zeolite may not have metals, metalloids, or oxides thereof impregnated or otherwise deposited onto the surfaces of the ZSM-11 zeolite. In embodiments, the ZSM-11 zeolite may be substantially free of impregnated metals, metalloids, or oxides thereof, such as having less than or equal to 0.01 wt. % impregnated metals, metalloids, or oxides thereof based on the total weight of the ZSM-11 zeolite. The presence of impregnated metals, metalloids, or oxides of these can change the catalytic properties of the ZSM-11 zeolite for converting crude oil to light olefins, light aromatic compounds or both through steam catalytic cracking. In embodiments, the cracking catalyst does not include any binders, matrix materials, or other catalytic species supported on the ZSM-11 zeolite.

As previously discussed, the steam catalytic cracking effluent 140 may include one or more products and intermediates, such as but not limited to light hydrocarbon gases, light olefins, aromatic compounds, pyrolysis oil, or combinations of these. The light olefins in the steam catalytic cracking effluent 140 may include ethylene, propylene, butenes, or combinations of these.

The steam catalytic cracking system 110 may achieve a light olefin yield of greater than or equal to 40 wt. %, or greater than or equal to 45 wt. % based on the total weight of stream, such as the steam catalytic cracking effluent 140. In embodiments, the steam catalytic cracking system 110 may achieve a light olefin yield of from 40 wt. % to 60 wt. %, from 40 wt. % to 55 wt. %, from 40 wt. % to 50 wt. %, from 41 wt. % to 60 wt. %, from 41 wt. % to 55 wt. %, from 41 wt. % to 50 wt. %, from 42 wt. % to 60 wt. %, from 42 wt. % to 55 wt. %, or from 42 wt. % to 50 wt. % based on the total weight of the stream, such as steam catalytic cracking effluent 140.

Referring again to FIG. 1, the steam catalytic cracking system 110 may further include a cracking effluent separation system 150 disposed downstream of the steam catalytic cracking reactors 130. When the steam catalytic cracking system 110 includes a plurality of steam catalytic cracking reactors 130, the steam catalytic cracking effluents 140 from each of the steam catalytic cracking reactors 130 may be passed to a single shared cracking effluent separation system 150. In embodiments, each steam catalytic cracking reactor 130 may have its own dedicated cracking effluent separation system 130. The steam catalytic cracking effluent 140 may be passed from the steam catalytic cracking reactor 130 directly to the cracking effluent separation system 150. The cracking effluent separation system 150 may separate the steam catalytic cracking effluent 140 into one or more than one cracking product effluents, which may be liquid or gaseous product effluents.

Referring again to FIG. 1, the cracking effluent separation system 150 may include one or a plurality of separation units. Separation units may include but are not limited to distillation columns, fractionators, flash drums, knock-out drums, knock-out pots, centrifuges, decanters, filtration devices, traps, scrubbers, expansion devices, membranes, solvent extraction devices, adsorption devices, chemical separators, crystallizers, chromatographs, precipitators, evaporators, driers, high-pressure separators, low-pressure separators, or combinations or these. The separation units may include one or more gas-liquid separators, one or more liquid-liquid separators, or a combination of these.

In embodiments, the cracking effluent separation system 150 may include a gas-liquid separation unit 160 and a centrifuge unit 170 downstream of the gas-liquid separation unit 160. The gas-liquid separation unit 160 may operate to separate the steam catalytic cracking effluent 140 into a liquid effluent 162 and a gaseous effluent 164. The gas-liquid separation unit 160 may operate to reduce the temperature of the steam catalytic cracking effluent 140 to condense constituents of the steam catalytic cracking effluent 140 having greater than or equal to 5 carbon atoms. The gas-liquid separation unit 160 may operate at a temperature of from 10° C. to 15° C. to ensure that normal pentane and constituents with boiling point temperatures greater than normal pentane are condensed into the liquid effluent 162. The liquid effluent 162 may include distillation fractions such as naphtha, kerosene, gas oil, vacuum gas oil; unconverted feedstock; residue; water; or combinations of these. The liquid effluent 162 may include the light aromatic compounds produced in the steam catalytic cracking reactor 130, which light aromatic compounds may include but are not limited to benzene, toluene, mixed xylenes, ethylbenzene, and other light aromatic compounds. The liquid effluent 162 may include at least 95%, at least 98%, at least 99%, or even at least 99.5% of the hydrocarbon constituents of the steam catalytic cracking effluent 140 having greater than or equal to 5 carbon atoms. The liquid effluent 162 may include at least 95%, at least 98%, at least 99%, or even at least 99.5% of the water from of the steam catalytic cracking effluent 140.

The gaseous effluent 164 may include olefins, such as ethylene, propylene, butenes, or combinations of these; light hydrocarbon gases, such as methane, ethane, propane, n-butane, butane, or combinations of these; other gases, such as but not limited to hydrogen; or combinations of these. The gaseous effluent 164 may include the $C_2$-$C_4$ olefin products, such as but not limited to, ethylene, propylene, butenes (1-butene, cis-2-butene, trans-2-butene, isobutene, or combinations of these), or combinations of these, produced in the steam catalytic cracking reactor 130. The gaseous effluent 164 may include at least 90%, at least 95%, at least 98%, at least 99%, or at least 99.5% of the $C_2$-$C_4$ olefins from the steam catalytic cracking effluent 140. The gaseous effluent 164 may be passed to a downstream gas separation system (not shown) for further separation of the gaseous effluent 164 into various product streams, such as but not limited to one or more olefin product streams.

In embodiments, the liquid effluent 162, which includes the water and hydrocarbon having greater than 5 carbon atoms, may be passed to the in-line centrifuge unit 170. The in-line centrifuge unit 170 may operate to separate the liquid effluent 162 into a liquid hydrocarbon effluent 172 and an aqueous effluent 174. The in-line centrifuge unit 170 may be operated at a rotational speed of from 2500 rpm to 5000 rpm, from 2500 rpm to 4500 rpm, from 2500 rpm to 4000 rpm, from 3000 rpm to 5000 rpm, from 3000 rpm to 4500 rpm, or from 3000 rpm to 4000 rpm to separate the hydrocarbon phase from the aqueous phase.

The liquid hydrocarbon effluent 172 may include hydrocarbons from the steam catalytic cracking effluent 140 having greater than or equal to 5 carbon atoms. The liquid hydrocarbon effluent 172 may include the light aromatic compounds produced in the steam catalytic cracking reactor 130, which light aromatic compounds may include but are not limited to benzene, toluene, mixed xylenes, ethylbenzene, and other light aromatic compounds. The liquid hydrocarbon effluent 172 may further include naphtha, kerosene, diesel, vacuum gas oil (VGO), or combinations of these. The liquid hydrocarbon effluent 172 may include at least 90%, at least 95%, at least 98%, at least 99%, or even at least 99.5% of the hydrocarbon constituents from the liquid effluent 162. The liquid hydrocarbon effluent 172 may be passed to a downstream treatment processes for further conversion or separation. At least a portion of the liquid hydrocarbon effluent 172 may be passed back to the steam catalytic cracking reactor 130 for further conversion to olefins. The aqueous effluent 174 may include water and water-soluble constituents from the liquid effluent 162. The aqueous effluent 174 may include some dissolved hydrocarbons soluble in the aqueous phase of the liquid effluent 162. The aqueous effluent 174 may include at least 95%, at least 98%, at least 99%, or even at least 99.5% of the water from the liquid effluent 162. The aqueous effluent 174 may be passed to one or more downstream processes for further treatment. In embodiments, at least a portion of the aqueous effluent 174 may be passed back to the steam catalytic cracking reactor 130 as at least a portion of the water 120 introduced to the steam catalytic cracking reactor 130.

In embodiments, the ZSM-11 zeolite produced by previously described processes may be used as a catalyst in a fluidized catalytic cracking (FCC) reactor. The FCC reactor may be a fluidized bed reactor. In the FCC reactor, the cracking catalyst consisting of the ZSM-11 zeolite may be contacted with the hydrocarbon feed, such as crude oil, in the presence of steam to produce light olefins, light aromatic compounds, or combinations of these. In embodiments, the cracking catalyst consists of the ZSM-11 zeolite. Suitable FCC processes for catalytically cracking crude oil in the presence of steam are disclosed in U.S. patent application Ser. No. 17/009,008, U.S. patent application Ser. No. 17/009,012, U.S. patent application Ser. No. 17/009,020, U.S. patent application Ser. No. 17/009,022, U.S. patent application Ser. No. 17/009,039, U.S. patent application Ser. No. 17/009,048, and U.S. patent application Ser. No. 17/009,073, all of which are incorporated by reference in their entireties in the present disclosure. The hydrocarbon feed can be any of the hydrocarbon feeds previously discussed in the present disclosure. The FCC reactor may be an upflow or a downflow FCC reactor. The FCC reactor system can include one or a plurality of FCC reactors, with one or a plurality of catalyst regenerators.

In embodiments, the FCC reactor may be operated at a reaction temperature of at least about 500° C., such as a reaction temperature of from 500° C. to 800° C., from 550° C. to 800° C., from 600° C. to 800° C., from 650° C. to 800° C., from 500° C. to 750° C., from 550° C. to 750° C., from 600° C. to 750° C., from 650° C. to 750° C., from 500° C. to 700° C., from 550° C. to 700° C., from 600° C. to 700° C., or from 650° C. to 700° C. Steam may be injected to the FCC reactor. The hydrocarbon feed may be catalytically cracked in the presence of the steam with the ZSM-11 zeolite. The steam to the hydrocarbon mass ratio in the FCC reactor may be from 0.2 to 0.8, from 0.3 to 0.8, from 0.4 to 0.8, from 0.5 to 0.8, from 0.2 to 0.7, from 0.3 to 0.7, from 0.4 to 0.7, from 0.5 to 0.7, from 0.2 to 0.6, from 0.3 to 0.6, from 0.4 to 0.6, or from 0.5 to 0.6. Steam may refer to all water in the FCC reactor. In embodiments, the residence time of the hydrocarbon feed and the steam in contact with the cracking catalyst in the FCC reactor may be from 1 second to 20 seconds, from 2 seconds to 20 seconds, from 5 seconds to 20 seconds, from 8 seconds to 20 seconds, from 1 second to 18 seconds, from 2 seconds to 18 seconds, from 5 seconds to 18 seconds, from 8 seconds to 18 seconds, from 1 second to 16 seconds, from 2 seconds to 16 seconds, from 5 seconds to 16 seconds, from 8 seconds to 16 seconds, from 1 second to 14 seconds, from 2 seconds to 14 seconds, from 5 seconds to 14 seconds, from 8 seconds to 14 seconds, from 1 second to 12 seconds, from 2 seconds to 12 seconds, from 5 seconds to 12 seconds, or from 8 seconds to 12 seconds. In embodiments, the cracking catalyst to hydrocarbon (catalyst to oil) weight ratio in the FCC reactor may be from 3 to 40, such as from 3 to 30, from 3 to 20, from 5 to 40, from 5 to 30, from 5 to 20, from 5 to 10, from 7 to 40, from 7 to 30, 7 to 20, from 7 to 10, from 10 to 40, from 10 to 30, from 10 to 20, or from 20 to 40. The cracking effluent from the FCC reactor can be separated into various product streams, intermediate streams, and an aqueous stream in a separation system downstream of the FCC reactor.

EXAMPLES

The various aspects of the present disclosure will be further clarified by the following examples. The examples are illustrative in nature and should not be understood to limit the subject matter of the present disclosure.

Examples 1-3: Preparation of ZSM-11 zeolite

In Examples 1-3, the ZSM-11 zeolites of the present disclosure having different molar ratios of silica to alumina were prepared. To prepare the ZSM-11 zeolites, 51 g of tetraethyl orthosilicate was slowly added to the solution containing 2.62 g (Example 1), 5.24 g (Example 2), or 6.1 (Example 3) of $Al(NO_3)_3 \cdot 9H_2O$ respectively and 26 g of water to produce a first mixture. Afterwards, 0.51 g of sodium hydroxide dissolved in 21.4 g of water was added dropwise to the first mixture, while mixing, to produce a second mixture. Then 77 g of tetra-butyl ammonium hydroxide was added to the second mixture under stirring for 3 hours to produce a third mixture. The crystallization was conducted under agitation in a Teflon-lined autoclave at 170° C. for 6 days to produce solid particles. The solid particles were recovered by filtration, washed out with distilled water (0.5 L) and dried at 90° C. overnight. The dried solid particles were calcined in air at 550° C. for 8 h (1° C. /min) to produce ZSM-11 zeolite particles. The ZSM-11 zeolites of Examples 1-3 were converted to the hydrogen forms by ion-exchanging ZSM-11 zeolites with 1.0 M $NH_4NO_3$ solution (4.5 hours stirring at 80° C.) followed by calcination in static air at 550° C. for 5 hours. Examples 1-3 have a molar ratio of $SiO_2$ to $Al_2O_3$ of 30, 40, and 70, respectively.

Comparative Example 4: ZSM-5 Zeolite

For Comparative Example 4, a commercial ZSM-5 zeolite was provided for comparison to the ZSM-11 zeolites of Examples 1-3. The commercial ZSM-5 zeolite (CBV 8014) from Zeolyst International was used, with a silica to alumina molar ratio of 80.

Figure 3:
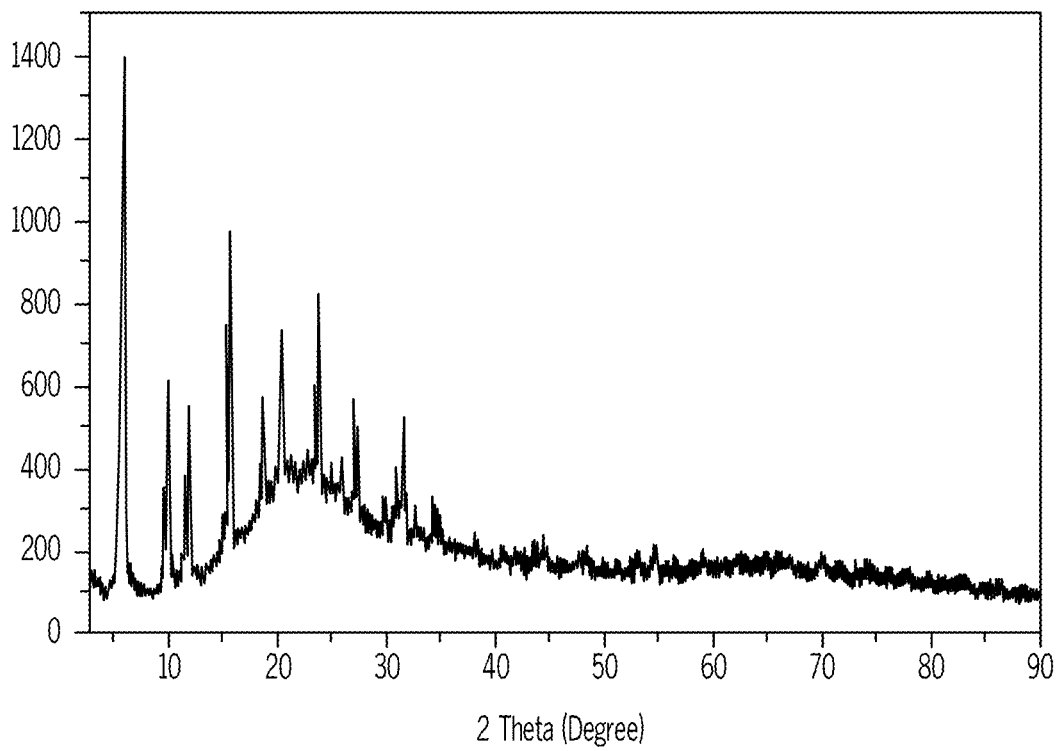
FIG. 3 graphically depicts an X-Ray Diffraction (XRD) spectrum for the commercial E-CAT cracking catalyst of Comparative Example 4, according to one or more embodiments shown and described in the present disclosure.

The commercial ZSM-5 zeolite of Comparative Example 4 was characterized by powder X-ray diffraction (XRD). The XRD was performed on a Rigaku's Mini-flex II system using nickel-filtered CuKα radiation (λ=1.5406 Å) operated in a static scanning mode with a detector angular speed of 2° per minute and a step size of 0.02°. FIG. 3 shows that the X-ray diffraction (XRD) diagram of E-Cat, indicating that this catalyst is a crystalline material with some amorphous phase in the structure. The crystallized phase was identified as mainly Faujasite.

Characterization of ZSM-11 zeolites of Examples 1-3

The ZSM-11 zeolites of Examples 1-3 were characterized by powder X-ray diffraction (XRD) and nitrogen adsorption, temperature program desorption with ammonia ($NH_3$-TPD)

and scanning electron microscope (SEM) images. The XRD was performed on a Rigaku's Mini-flex II system using nickel-filtered CuKα radiation (λ=1.5406 Å) operated in a static scanning mode with a detector angular speed of 2° per minute and a step size of 0.02°.

Figure 4:
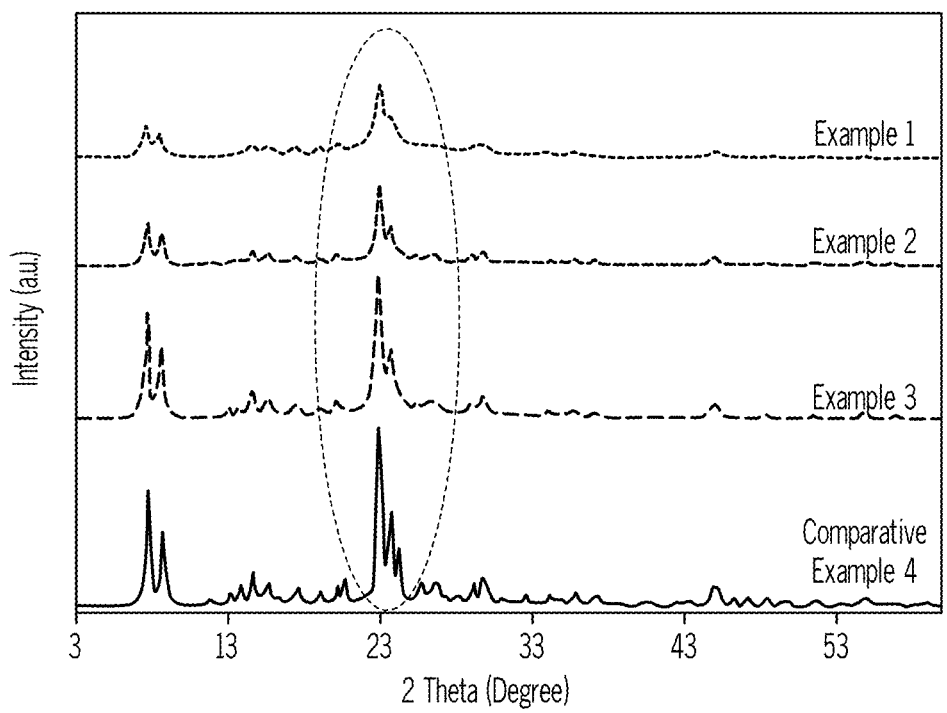
FIG. 4 graphically depicts an X-Ray Diffraction (XRD) spectrum for zeolites of Examples 1-3 and Comparative Example 4, according to one or more embodiments shown and described in the present disclosure.
Figure 5:
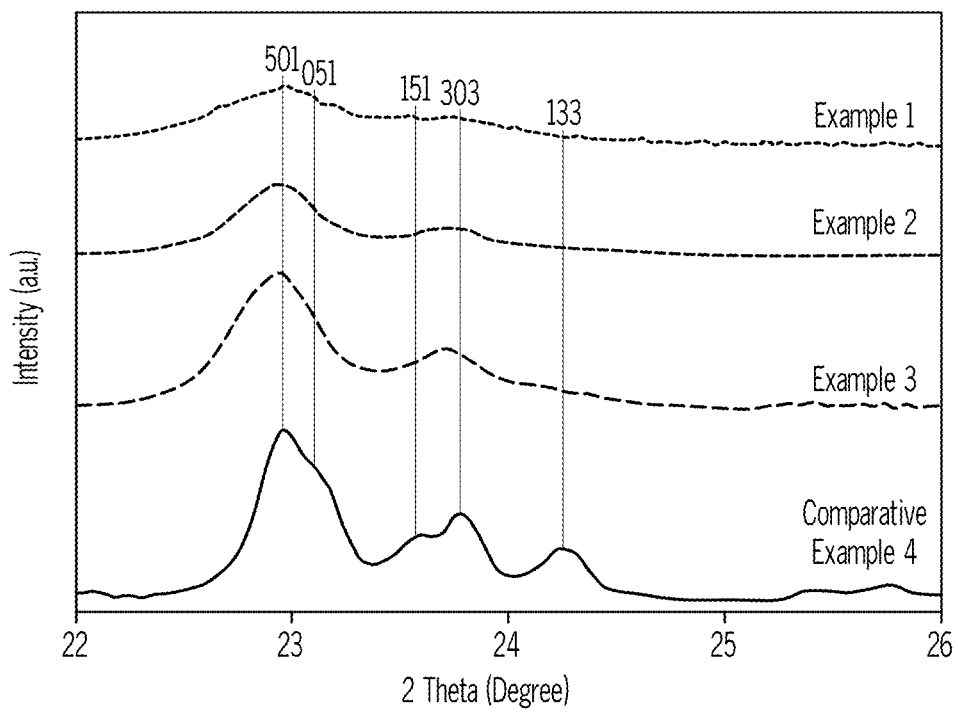
FIG. 5 graphically depicts an X-Ray Diffraction (XRD) spectrum for zeolites of Examples 1-3 and Comparative Example 4, according to one or more embodiments shown and described in the present disclosure.

As shown in FIG. 4, Examples 1-3 exhibited characteristic peaks of ZSM-11 structure in the ranges 2θ=7-10° and 2θ=22-25°. As shown in FIG. 5, the ZSM-5 zeolite of Comparative Example 4 exhibited five characteristic diffraction peaks indexed to the 501, 051, 151, 303 and 133 zeolite crystalline structure, while the ZSM-11 zeolites of Examples 1-3 exhibited only two peaks, peaks 501 and 303, which are indicative of a zeolite crystalline structure. The ZSM-11 zeolites of Examples 1-3 did not exhibit the peaks 051, 151, and 133 characteristic of ZSM-5 zeolites. Referring to FIG. 4, similar differences were found at the 2θ range of 8.8-9.2° and 45.0-45.7°, respectively. The ZSM-5 content in the ZSM-11 zeolites were about 30 wt. %. Crystallinity of prepared ZSM-11 zeolites of Examples 1-3 showed to decrease with an increase in the $SiO_2/Al_2O_3$ molar ratio.

Figure 6:
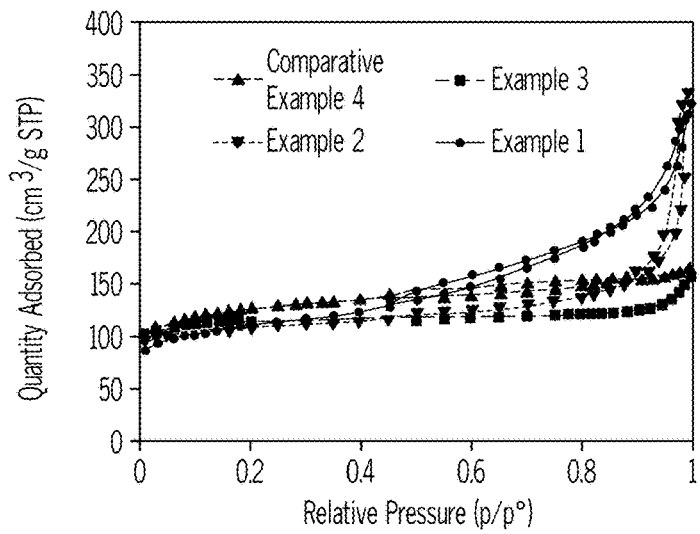
FIG. 6 graphically depicts $N_2$ adsorption-desorption isotherms for zeolites of Examples 1-3 and Comparative Example 4, according to one or more embodiments shown and described in the present disclosure.
Figure 7:
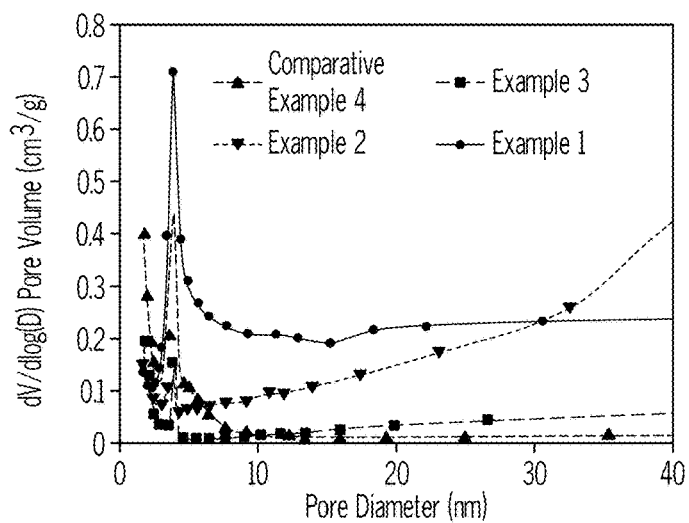
FIG. 7 graphically depicts a pore size distribution for zeolites of Examples 1-3 and Comparative Example 4, according to one or more embodiments shown and described in the present disclosure.

Further, Nitrogen adsorption at −195° C. was performed on a Quanta Chrome's Autosorb-1. Physical properties such as BET surface area, pore volume and average pore dimeter are presented in Table 3. The $N_2$ adsorption-desorption isotherms of the Examples 1-3 and Comparative Example 4 are shown in FIGS. 6 and 7. All zeolites showed a type I isotherm, with the specific surface areas evaluated by BET method of 337-397 $m^2/g$ and micropore volume in the range of 0.106-0.435 $cm^3/g$. The high micropore volumes were in agreement with the high relative crystallinities of all the samples. All prepared ZSM-11 zeolites of Examples 1-3 had a narrow pore distribution of around 3.9 nm.

Table 3: Physio-chemical properties of ZSM-11 zeolites of Examples 1-3 and ZSM-5 zeolite of Comparative Example 4.

| Example | Zeolite | $SiO_2/Al_2O_3$ (mole ratio) | Surface area ($m^2/g$) | Pore volume ($cm^3/g$) | Pore Diameter (nm) |
|---|---|---|---|---|---|
| Comparative Example 4 | ZSM-5(80) | 80 | 397 | 0.142 | 3.087 |
| Example 3 | ZSM-11(70) | 70 | 347 | 0.106 | 5.460 |
| Example 2 | ZSM-11(40) | 40 | 337 | 0.399 | 13.432 |
| Example 1 | ZSM-11(30) | 30 | 355 | 0.435 | 7.62 |

Figure 8:
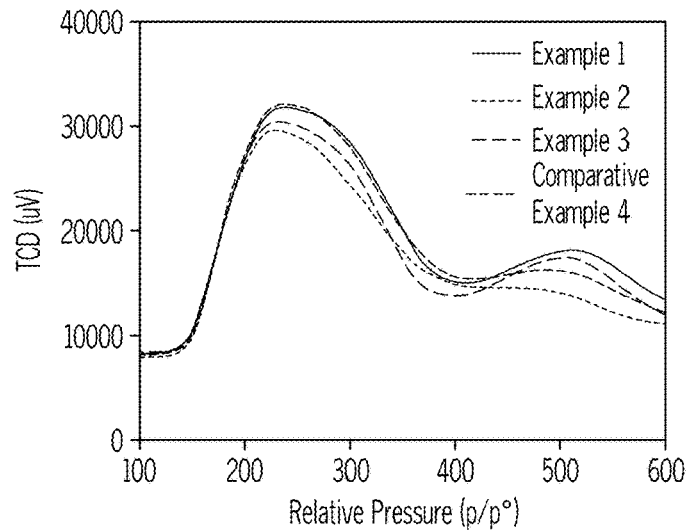
FIG. 8 graphically depicts a $NH_3$-Temperature-programmed desorption (TPD) profile for zeolites of Examples 1-3 and Comparative Example 4, according to one or more embodiments shown and described in the present disclosure.

Further, the $NH_3$-TPD were performed to investigate the acid properties of ZSM-11 zeolites of Examples 1-3 and commercial ZSM-5 zeolite of Comparative Example 4. As shown in FIG. 8, two peaks appeared for all the curves of different samples, one centered at about 230° C. and another at about 540° C., representing the $NH_3$ desorption from weak and strong acid sites, respectively. Table 4 shows the calculated total acid site amounts of ZSM-11 zeolites of Examples 1-3 and ZSM-5 zeolite of Comparative Example 4.

Table 4. Determination of total acidity of ZSM-11 zeolites of Examples 1-3 and ZSM-5 zeolite of Comparative Example 4.

| Example | Catalyst | Amount NH₃ desorbed (mmol/g) | | |
|---|---|---|---|---|
| | | I<br>100-350° C. | II<br>Above 350° C. | Total |
| Comparative Example 4 | ZSM-5(80) | 0.139 | 0.069 | 0.208 |
| Example 3 | ZSM-11(70) | 0.155 | 0.079 | 0.234 |
| Example 2 | ZSM-11(40) | 0.181 | 0.060 | 0.241 |
| Example 1 | ZSM-11(30) | 0.149 | 0.056 | 0.205 |

Figure 9:
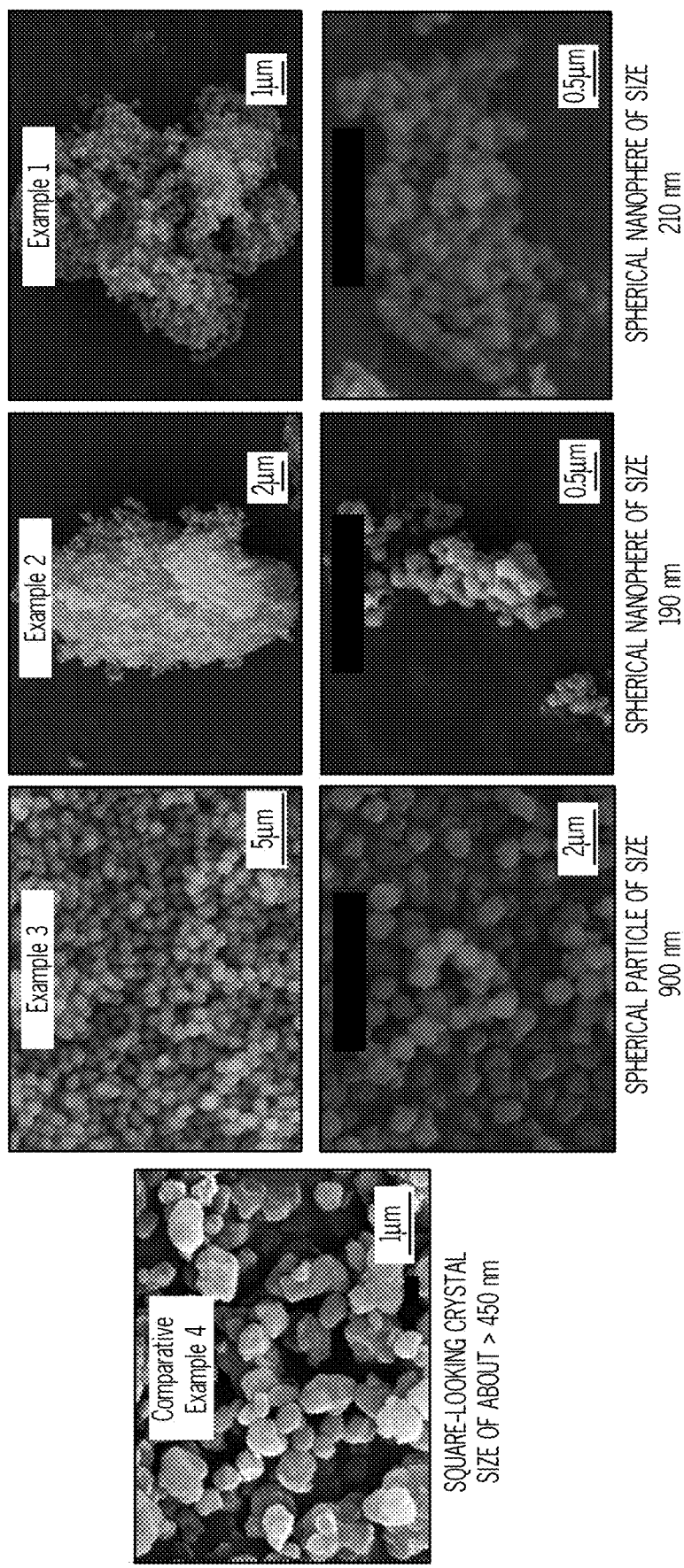
FIG. 9 depicts scanning electron microscope (SEM) images for zeolites of Examples 1-3 and Comparative Example 4, according to one or more embodiments shown and described in the present disclosure.

The SEM micrographs shown in FIG. 9 show the shapes and sizes of ZSM-11 zeolites of Examples 1-3 and the commercial ZSM-5 zeolite of Comparative Example 4. Cubic units were observed for the commercial ZSM-5 zeolite of the Comparative Example 4. The commercial ZSM-5 zeolite of Comparative Example 4 showed square-looking crystals of sizes less than 150 nm. In contrast, the ZSM-11 zeolite of Examples 1-3 exhibited spherical aggregates. The ZSM-11 zeolite of Example 3, which had a $SiO_2/Al_2O_3$ molar ratio of 70 appeared with the uniformly dispersed spherical particles size (900-950 nm). Whereas decrease in $SiO_2/Al_2O_3$ molar ratio, as with the ZSM-11 zeolites of Examples 1 and 2, showed small spherical nanospheres of size up to 190 nm and 210 nm, respectively.

Example 5-7 and Comparative Example 8: Preparation of Cracking Catalyst

For Example 5, a cracking catalyst was prepared by mixing 75 wt. % of Equilibrium Catalyst (E-Cat) and 25 wt. % of ZSM-11 zeolite of Example 1 based on total amount of the cracking catalyst. For Example 6, a cracking catalyst was prepared by mixing 75 wt. % of E-Cat and 25 wt. % of ZSM-11 zeolite of Example 2 based on total amount of the cracking catalyst. For Example 7, a cracking catalyst was prepared by mixing 75 wt. % of E-Cat and 25 wt. % of ZSM-11 zeolite of Example 3 based on total amount of the cracking catalyst. For Comparative Example 8, a cracking catalyst was prepared by mixing 75 wt. % of E-Cat and 25 wt. % of ZSM-5 zeolite of Comparative Example 4 based on total amount of the cracking catalyst.

Example 11: Cracking Catalyst Evaluation

Figure 11:
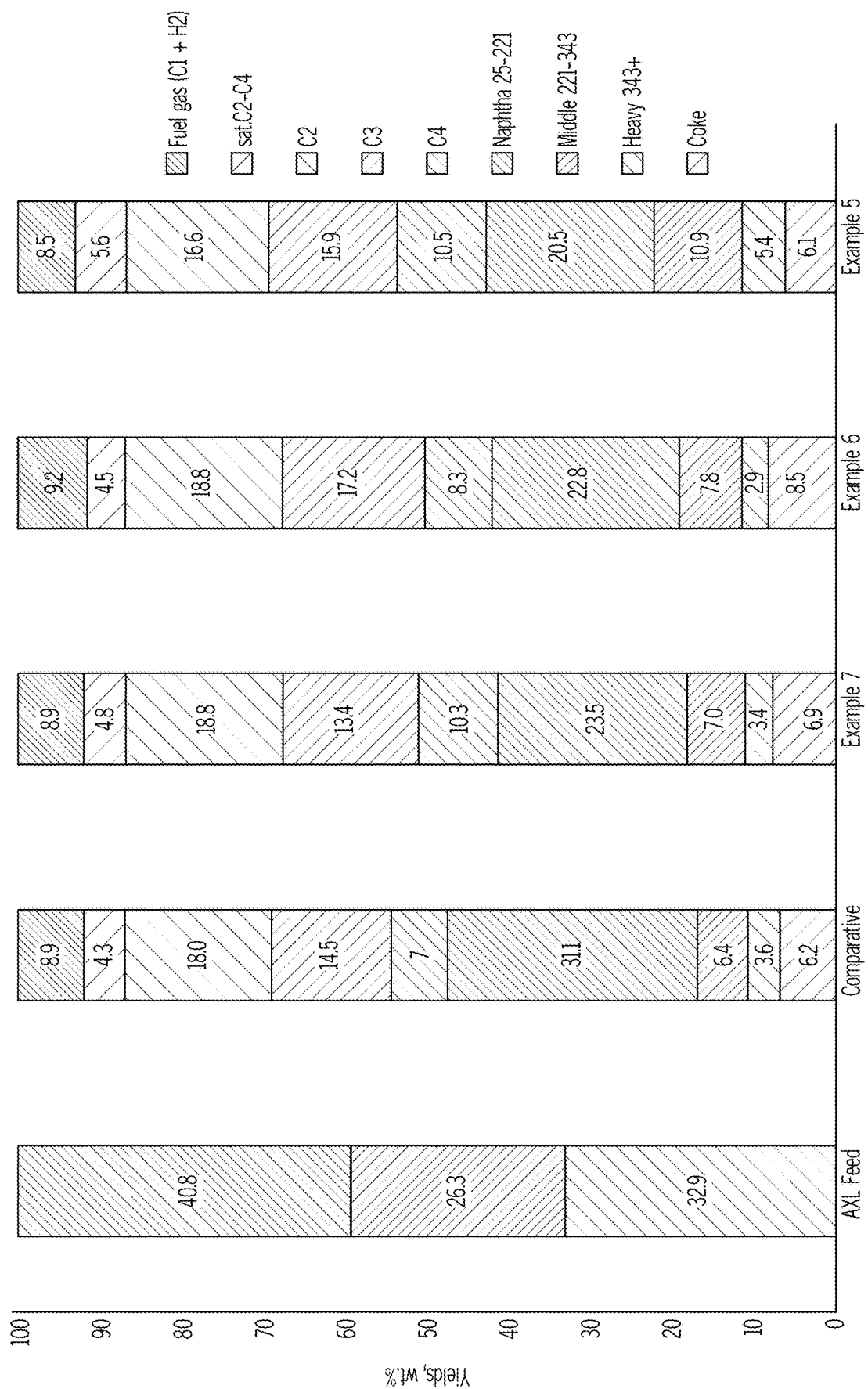
FIG. 11 graphically depicts product yields obtained from cracking an AXL crude oil with cracking catalysts of Examples 5-7 and Comparative Example 8, according to one or more embodiments shown and described in the present disclosure.

In Example 11, the cracking catalysts of Examples 5-7 and Comparative Example 8 were evaluated at atmospheric pressure in a fixed-bed reaction (FBR) system for steam catalytic cracking of crude oil such as AXL crude oil. FIG. 11 presents the results of AXL cracking over the cracking catalysts of Examples 5-7 and Comparative Example 8. As shown in FIG. 11, olefin selectivity over cracking catalysts of Examples 5-7 were higher than that over cracking catalyst of Comparative Example 8. The general make-up of the AXL crude oil is provided in Table 5. The cracked gaseous and liquid products were characterized by off-line gas chromatographic (GC) analysis using simulated distillation and naphtha analysis techniques.

Referring now to FIG. 10, the FBR system 300 for conducting the experiments of Example 6 is schematically depicted. AXL crude oil 301 was fed to a fixed-bed reactor 340 using a metering pump 311. A constant feed rate of 2 g/h of the AXL crude oil 301 was used. Water 302 was fed to the fixed bed reactor 340 using a metering pump 312. Water 302 was preheated using a preheater 321. A constant feed rate of 1 g/h of water 302 was used. Nitrogen 303 was used as a carrier gas at 65 mL/min. Nitrogen 303 was fed to the fixed bed reactor 340 using a Mass Flow Controller (MFC) 313. Nitrogen 303 was preheated using a preheater 322. Water 302 and Nitrogen 303 were mixed using a mixer 330 and the mixture was introduced to the fixed-bed reactor 340. Prior to entering the reactor tube, the AXL crude oil 301, water 302, and nitrogen 303 were preheated up to 250° C. in the pre-heating zone 342. The pre-heating zone 342 was pre-heated using line heaters 331. Crude oil 301 was introduced from the top of the reactor 340 through the injector 341 and mixed with steam in the top two-third of the reactor tube 340 before reaching the catalyst bed 344.

The catalyst bed 344 in the reactor tube 340 was moved a few centimeters down to allow more time for pre-heating of AXL crude oil 301 prior to contacting with the cracking catalyst in the catalyst bed 344. For each experiment, 1 gram (g) of cracking catalyst having a mesh size of 30-40 was placed at the center of the reactor tube 340, supported by quartz wool 343, 346 and a reactor insert 345. Quartz wool 343, 346 was placed both at the bottom and top of the catalyst bed 344 to keep it in position. The height of the catalyst bed 344 was 1-2 cm. The cracking catalysts of Examples 5-7 and Comparative Example 8 were each used as the cracking catalyst a different experiment conducted for Example 6. Prior to conducting the steam catalytic cracking reaction, each of the cracking catalysts of Examples 5-7 and Comparative Example 8 were steam deactivated in the presence of steam at a temperature of 810° C. for 6 hours.

Following steam deactivation, the crude oil hydrocarbon feed and the water/steam were introduced to the reaction tube of the FBR. The reaction was allowed to take place for 45-60 min, until steady state was reached. The mass ratio of steam to crude oil was 0.5 grams of steam per gram of crude oil. The crude oil was cracked at a cracking temperature of 675° C. and a weight ratio of catalyst to crude oil of 1:2. The residence time of the crude oil and the steam in the fixed bed reactor 340 was 10 seconds. The total time on stream for each individual experiment of Example 11 was 5 hours.

The cracking reaction product stream 345 was introduced to a gas-liquid separator 351. A Wet Test Meter 352 was placed downstream of the gas-liquid separator 351. The cracked gaseous products 361 and liquid products 362 were characterized by off-line gas chromatographic (GC) analysis using simulated distillation and naphtha analysis techniques. The reaction product streams from the cracking reaction were analyzed for yields of ethylene, propylene, and butylene. The yield analyses for Example 11 are depicted in FIG. 11 and provided numerically in Table 5.

TABLE 5

| Stream | Feed | Effluent | Effluent | Effluent | Effluent |
|---|---|---|---|---|---|
| Example | — | Example 5 | Example 6 | Example 7 | Comparative Example 8 |
| Zeolite Catalyst Component | — | ZSM-11 of Ex. 1 | ZSM-11 of Ex. 2 | ZSM-11 of Ex. 3 | ZSM-5 of Comparative Example 4 |
| Temperature (° C.) | — | 675 | 675 | 675 | 675 |
| Steam/Oil Weight Ratio | — | 0.5 | 0.5 | 0.5 | 0.5 |
| Residence Time (seconds) | — | 10 | 10 | 10 | 10 |
| Fuel Gas (C1 & H2) (wt. %) | — | 8.5 | 9.2 | 8.9 | 8.9 |
| Saturated C2-C4 (wt. %) | — | 5.6 | 4.5 | 4.8 | 4.3 |
| Ethylene (wt. %) | — | 16.6 | 18.8 | 18.8 | 18.0 |
| Propylene (wt. %) | — | 15.9 | 17.2 | 16.4 | 14.5 |
| Total Butenes (wt. %) | — | 10.5 | 8.3 | 10.3 | 7 |

TABLE 5-continued

| Stream | Feed | Effluent | Effluent | Effluent | Effluent |
|---|---|---|---|---|---|
| Naphtha (15° C.-221° C.) (wt. %) | 40.8 | 20.5 | 22.8 | 23.5 | 31.1 |
| Middle Distillate (221° C.-343° C.) (wt. %) | 26.3 | 10.9 | 7.8 | 7.0 | 6.4 |
| Heavy (343° C.+) (wt. %) | 32.9 | 5.4 | 2.9 | 3.4 | 3.6 |
| Coke (wt. %) | — | 6.1 | 8.5 | 6.9 | 6.2 |
| Total (wt. %) | 100 | 100 | 100 | 100 | 100 |
| Total Light Olefins (wt. %) | 0.0 | 43 | 44.3 | 45.5 | 39.5 |

The yields in Table 5 are expressed in units of weight percent based on the total weight of the stream.

The results in Table 5 and in FIG. 11 show that the cracking catalysts of Examples 5-7 having ZSM-11 zeolites of Examples 1-3 can directly convert crude oil into petrochemical products, such as light olefins and aromatic compounds. From the results, it can be seen that ZSM-11 zeolites of Examples 1-3 provide high yields of light olefins, which include the ethylene, propylene, and total butenes. In fact, each of the ZSM-11 zeolites of Examples 1-3 produced a total yield of light olefins greater than the yield of light olefins using the ZSM-5 zeolite of Comparative Example 4. The ZSM-11 zeolites of Examples 1-3 produced substantially greater yields of total light olefins compared to the ZSM-5 zeolite of Comparative Example 4.

Additionally, the cracking catalysts of Examples 5-7 having ZSM-11 zeolites of Examples 1-3 resulted in greater conversion of the middle distillates portion of the hydrocarbon feed, as shown by the reduced concentration of middle distillates and heavy distillates in the cracking effluent produced using the cracking catalysts of Examples 5-7 having ZSM-11 zeolites of Examples 1-3 compared to the cracking effluent produced using the cracking catalyst of Comparative Example 8 having ZSM-5 zeolite of Comparative Example 4.

A first aspect of the present disclosure may be directed to a process for upgrading a hydrocarbon feed comprising contacting the hydrocarbon feed with steam in the presence of a cracking catalyst in a steam catalytic cracking reactor at reaction conditions sufficient to cause at least a portion of hydrocarbons in the hydrocarbon feed to undergo one or more cracking reactions to produce a steam catalytic cracking effluent comprising light olefins, light aromatic compounds, or both, where the cracking catalyst comprises a ZSM-11 zeolite.

A second aspect of the present disclosure may include the first aspect, where the ZSM-11 zeolite has a molar ratio of silica to alumina of from 20 to 3000.

A third aspect of the present disclosure may include either one of the first or second aspects, where the ZSM-11 zeolite does not have metals, metalloids, or oxides thereof impregnated or otherwise deposited onto the surfaces of the ZSM-11 zeolite.

A fourth aspect of the present disclosure may include any one of the first through third aspects, where the ZSM-11 zeolite has an average surface area of from 300 square meter per gram ($m^2/g$) to 390 $m^2/g$.

A fifth aspect of the present disclosure may include any one of the first through fourth aspects, where the ZSM-11 zeolite has an average pore diameter of from 5 nanometers (nm) to 15 nm.

A sixth aspect of the present disclosure may include any one of the first through fifth aspects, where the ZSM-11 zeolite has a total pore volume of from 0.1 square centimeter per gram ($cm^3/g$) to 0.5 $cm^3/g$.

A seventh aspect of the present disclosure may include any one of the first through sixth aspects, where the ZSM-11 zeolite has a total acidity of from 0.150 mmol $NH_3$ per gram to 0.300 mmol $NH_3$ per gram.

An eighth aspect of the present disclosure may include any one of the first through seventh aspects, where the ZSM-11 zeolite does not exhibit x-ray diffraction peaks corresponding to a 051 zeolite crystalline structure, a 151 zeolite crystalline structure, or a 133 zeolite crystalline structure.

A ninth aspect of the present disclosure may include any one of the first through eighth aspects, where the cracking catalyst comprises less than or equal to 30% zeolite crystalline structures characteristic of ZSM-5 zeolite.

A tenth aspect of the present disclosure may include any one of the first through ninth aspects, where the hydrocarbon feed comprises a whole crude oil having an API gravity between 25 and 50.

An eleventh aspect of the present disclosure may include any one of the first through tenth aspects, where the hydrocarbon feed is a heavy crude oil, a light crude oil, an extra light crude oil, or combinations of these.

A twelfth aspect of the present disclosure may include any one of the first through eleventh aspects, where the steam catalytic cracking effluent comprises olefins and the olefins comprise one or more of ethylene, propylene, butenes, or combinations of these.

A thirteenth aspect of the present disclosure may include any one of the first through twelfth aspects, where the steam catalytic cracking reactor comprises one or more fixed bed reactors, fluidized bed reactor, batch reactor, moving bed catalytic cracking reactor, fluidized catalytic cracking (FCC) reactor, or combinations of these.

A fourteenth aspect of the present disclosure may include any one of the first through thirteenth aspects, comprising contacting the hydrocarbon feed with the steam in the presence of the cracking catalyst at a reaction temperature of from 500° C. to 800° C.

A fifteenth aspect of the present disclosure may include any one of the first through fourteenth aspects, comprising contacting the hydrocarbon feed with the steam in the presence of the cracking catalyst at a mass ratio of steam to hydrocarbons of from 0.1 to 1.0.

A sixteenth aspect of the present disclosure may include any one of the first through fifteenth aspects, comprising contacting the hydrocarbon feed with the steam in the presence of the cracking catalyst for a residence time of from 1 second to 60 seconds.

A seventeenth aspect of the present disclosure may include any one of the first through sixteenth aspects, where the ZSM-11 zeolite is prepared by a method comprising: adding tetraethyl orthosilicate to a solution comprising $Al(NO_3)_3 \cdot 9H_2O$ and water to produce a first mixture, adding metal hydroxide to the first mixture to produce a second mixture, adding ammonium hydroxide to the second mixture to produce a third mixture, aging the third mixture at a temperature of from 100° C. to 300° C. for a time period sufficient to crystalize the third mixture to produce solid particles, and calcining the solid particles at a temperature of from 400° C. to 800° C. for 1 to 12 hours to produce the ZSM-11 zeolite.

An eighteenth aspect of the present disclosure may include any one of the first through seventeenth aspects, further comprising filtering the solid particles from the third mixture.

A nineteenth aspect of the present disclosure may include any one of the first through eighteenth aspects, further comprising washing the solid particles with water.

A twentieth aspect of the present disclosure may include any one of the first through nineteenth aspects, further comprising drying the solid particles at a temperature of from 50° C. to 200° C.

A twenty-first aspect of the present disclosure may include any one of the first through twentieth aspects, where the metal hydroxide comprises lithium hydroxide (LiOH), sodium hydroxide (NaOH), potassium hydroxide (KOH), rubidium hydroxide (RbOH), magnesium hydroxide (Mg(OH)$_2$), calcium hydroxide (Ca(OH)$_2$), strontium hydroxide (Sr(OH)$_2$), barium hydroxide (Ba(OH)$_2$), or combinations thereof A twenty-second aspect of the present disclosure may include any one of the first through twenty-first aspects, further comprising, after calcining, treating ZSM-11 zeolite with ammonium salt a temperature of from 50° C. to 100° C. for 1 to 12 hours.

A twenty-third aspect of the present disclosure may include any one of the first through twenty-second aspects, where the ammonium salt comprises ammonium nitrate, ammonium chloride, ammonium sulfate, ammonium carbonate, or combinations thereof.

A twenty-fourth aspect of the present disclosure may include any one of the first through twenty-third aspects, where the ammonium salt is in a solution and a concentration of metal hydroxide in the metal hydroxide solution is from 1 weight percent (wt. %) to 3 wt. %.

A twenty-fifth aspect of the present disclosure may include any one of the first through twenty-fourth aspects, where a concentration of tetraethyl orthosilicate in the first mixture is from 60 wt. % to 65 wt. % based on the total weight of the first mixture.

A twenty-sixth aspect of the present disclosure may include any one of the first through twenty-fifth aspects, where a concentration of Al(NO$_3$)$_3$·9H$_2$O in the first mixture is from 3 wt. % to 8 wt. % based on the total weight of the first mixture.

A twenty-seventh aspect of the present disclosure may include any one of the first through twenty-sixth aspects, where a concentration of metal hydroxide in the second mixture is from 0.4 wt. % to 0.6 wt. % based on the total weight of the second mixture.

A twenty-eighth aspect of the present disclosure may include any one of the first through twenty-seventh aspects, where a concentration of ammonium hydroxide in the third mixture is from 40 wt. % to 45 wt. % based on the total weight of the third mixture.

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A process for upgrading a hydrocarbon feed, the process comprising contacting the hydrocarbon feed with steam in the presence of a cracking catalyst in a steam catalytic cracking reactor at reaction conditions sufficient to cause at least a portion of hydrocarbons in the hydrocarbon feed to undergo one or more cracking reactions to produce a steam catalytic cracking effluent comprising light olefins, light aromatic compounds, or both, where the cracking catalyst comprises a ZSM-11 zeolite, where the ZSM-11 zeolite has a molar ratio of silica to alumina of from 20 to 70.

2. The process of claim 1, where the ZSM-11 zeolite does not have any other metals, metalloids, or oxides thereof impregnated or otherwise deposited onto the surfaces of the ZSM-11 zeolite after synthesis of the ZSM-11 zeolite.

3. The process of claim 1, where the ZSM-11 zeolite has an average surface area of from 300 square meter per gram (m$^2$/g) to 390 m$^2$/g, an average pore diameter of from 5 nanometers (nm) to 15 nm, a total pore volume of from 0.1 square centimeter per gram (cm$^3$/g) to 0.5 cm$^3$/g, or combinations of these.

4. The process of claim 1, where the ZSM-11 zeolite has a total acidity of from 0.150 mmol NH$_3$ per gram to 0.300 mmol NH$_3$ per gram.

5. The process of claim 1, where the cracking catalyst comprises less than or equal to 30% zeolite crystalline structures characteristic of ZSM-5 zeolite.

6. The process of claim 1, where the hydrocarbon feed comprises a whole crude oil having an API gravity between 25 and 50.

7. The process of claim 1, where the hydrocarbon feed is a heavy crude oil, a light crude oil, an extra light crude oil, or combinations of these.

8. The process of claim 1, where the steam catalytic cracking effluent comprises olefins and the olefins comprise one or more of ethylene, propylene, butenes, or combinations of these.

9. The process of claim 1, where the steam catalytic cracking reactor comprises one or more fixed bed reactors, fluidized bed reactor, batch reactor, moving bed catalytic cracking reactor, fluidized catalytic cracking (FCC) reactor, or combinations of these.

10. The process of claim 1, comprising contacting the hydrocarbon feed with the steam in the presence of the cracking catalyst at a reaction temperature of from 500° C. to 800° C., at a mass ratio of steam to hydrocarbons of from 0.1 to 1.0, for a residence time of from 1 second to 60 seconds, or combinations of these conditions.

11. A process for upgrading a hydrocarbon feed, the process comprising contacting the hydrocarbon feed with steam in the presence of a cracking catalyst in a steam catalytic cracking reactor at reaction conditions sufficient to cause at least a portion of hydrocarbons in the hydrocarbon feed to undergo one or more cracking reactions to produce a steam catalytic cracking effluent comprising light olefins, light aromatic compounds, or both, where the cracking catalyst comprises a ZSM-11 zeolite, where the ZSM-11 zeolite is prepared by a method comprising:

adding tetraethyl orthosilicate to a solution comprising Al(NO$_3$)$_3$·9H$_2$O and water to produce a first mixture;

adding metal hydroxide to the first mixture to produce a second mixture;

adding ammonium hydroxide to the second mixture to produce a third mixture;

aging the third mixture at a temperature of from 100° C. to 300° C. for a time period sufficient to crystalize the third mixture to produce solid particles; and calcining the solid particles at a temperature of from 400° C. to 800° C. for 1 to 12 hours to produce the ZSM-11 zeolite.

12. The process of claim 11, where the metal hydroxide comprises lithium hydroxide (LiOH), sodium hydroxide (NaOH), potassium hydroxide (KOH), rubidium hydroxide (RbOH), magnesium hydroxide ($Mg(OH)_2$), calcium hydroxide ($Ca(OH)_2$), strontium hydroxide ($Sr(OH)_2$), barium hydroxide ($Ba(OH)_2$), or combinations thereof.

13. The process of claim 11, further comprising, after calcining, treating ZSM-11 zeolite with ammonium salt a temperature of from 50° C. to 100° C. for 1 to 12 hours.

14. The process of claim 13, where the ammonium salt comprises ammonium nitrate, ammonium chloride, ammonium sulfate, ammonium carbonate, or combinations thereof.

15. The process of claim 13, where the ammonium salt is in a solution and a concentration of metal hydroxide in the metal hydroxide solution is from 1 weight percent (wt. %) to 3 wt. %.

16. The process of claim 11, where a concentration of tetraethyl orthosilicate in the first mixture is from 60 wt. % to 65 wt. % based on the total weight of the first mixture.

17. The process of claim 11, where a concentration of $Al(NO_3)_3 \cdot 9H_2O$ in the first mixture is from 3 wt. % to 8 wt. % based on the total weight of the first mixture.

18. The process of claim 11, where a concentration of metal hydroxide in the second mixture is from 0.4 wt. % to 0.6 wt. % based on the total weight of the second mixture.

19. The process of claim 11, where a concentration of ammonium hydroxide in the third mixture is from 40 wt. % to 45 wt. % based on the total weight of the third mixture.

\* \* \* \* \*